United States Patent
Breiholz et al.

(10) Patent No.: US 9,869,766 B1
(45) Date of Patent: Jan. 16, 2018

(54) ENHANCEMENT OF AIRBORNE WEATHER RADAR PERFORMANCE USING EXTERNAL WEATHER DATA

(71) Applicants: Arlen E. Breiholz, Cedar Rapids, IA (US); Kevin M. Kronfeld, Cedar Rapids, IA (US); Venkata A. Sishtla, Marion, IA (US)

(72) Inventors: Arlen E. Breiholz, Cedar Rapids, IA (US); Kevin M. Kronfeld, Cedar Rapids, IA (US); Venkata A. Sishtla, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 236 days.

(21) Appl. No.: 14/608,071

(22) Filed: Jan. 28, 2015

(51) Int. Cl.
*G01S 13/95* (2006.01)
*G01S 7/28* (2006.01)

(52) U.S. Cl.
CPC .............. *G01S 13/95* (2013.01); *G01S 7/28* (2013.01)

(58) Field of Classification Search
CPC .......... G01S 7/003; G01S 13/12; G01S 13/42; G01S 13/422; G01S 13/424;
(Continued)

(56) References Cited

U.S. PATENT DOCUMENTS

| 650,275 A | 5/1900 | Reeve |
| 3,251,057 A | 5/1966 | Buehler et al. |

(Continued)

FOREIGN PATENT DOCUMENTS

| EP | 1 329 738-81 | 7/2003 |
| FR | 2658617 A1 | 8/1991 |

(Continued)

OTHER PUBLICATIONS

U.S. Appl. No. 13/841,893, filed Mar. 15, 2013, Rockwell Collins, Inc.

(Continued)

*Primary Examiner* — Peter Bythrow
*Assistant Examiner* — Daniel P Malley, Sr.
(74) *Attorney, Agent, or Firm* — Donna P. Suchy; Daniel M. Barbieri

(57) ABSTRACT

Systems and methods for controlling a weather radar system are provided. A system for controlling a weather radar system includes a communications system including a transmitter-receiver and a processor. The transmitter-receiver is configured to receive first weather data from an external location. The first weather data includes a first weather condition, a location of the first weather condition, and a time of sensing the first weather condition. The processor includes a control module coupled with the communications system and configured to determine a point of interest based on the first weather data; acquire, by controlling an onboard weather radar system, second weather data at the point of interest; provide data representative of weather near the point of interest based at least in part on the second weather data; and transmit, by the transmitter-receiver, the data representative of weather near the point of interest to an external weather radar system.

13 Claims, 6 Drawing Sheets

(58) Field of Classification Search
CPC ........ G01S 13/426; G01S 13/72; G01S 13/87;
G01S 13/872; G01S 13/95; G01S 13/953;
G01S 13/958
See application file for complete search history.

(56) References Cited

U.S. PATENT DOCUMENTS

| | | |
|---|---|---|
| 3,359,557 A | 12/1967 | Fow et al. |
| 3,404,396 A | 10/1968 | Buchler et al. |
| 3,465,339 A | 9/1969 | Marner |
| 3,491,358 A | 1/1970 | Hicks |
| 3,508,259 A | 4/1970 | Andrews |
| 3,540,829 A | 11/1970 | Collinson et al. |
| 3,567,915 A | 3/1971 | Altshuler et al. |
| 3,646,555 A | 2/1972 | Atlas |
| 3,715,748 A | 2/1973 | Hicks |
| 3,764,719 A | 10/1973 | Dell |
| 3,781,530 A | 12/1973 | Britland et al. |
| 3,781,878 A | 12/1973 | Kirkpatrick |
| 3,803,609 A | 4/1974 | Lewis et al. |
| 3,885,237 A | 5/1975 | Kirkpatrick |
| 3,943,511 A | 3/1976 | Evans et al. |
| 3,964,064 A | 6/1976 | Brandao et al. |
| 3,968,490 A | 7/1976 | Gostin |
| 4,015,257 A | 3/1977 | Fetter |
| 4,043,194 A | 8/1977 | Tanner |
| 4,179,693 A | 12/1979 | Evans et al. |
| 4,223,309 A | 9/1980 | Payne |
| 4,240,108 A | 12/1980 | Levy |
| 4,283,715 A | 8/1981 | Choisnet |
| 4,283,725 A | 8/1981 | Chisholm |
| 4,318,100 A | 3/1982 | Shimizu et al. |
| 4,346,595 A | 8/1982 | Frosch et al. |
| 4,430,654 A | 2/1984 | Kupfer |
| 4,435,707 A | 3/1984 | Clark |
| 4,459,592 A | 7/1984 | Long |
| 4,533,915 A | 8/1985 | Lucchi et al. |
| 4,555,703 A | 11/1985 | Cantrell |
| 4,600,925 A | 7/1986 | Alitz et al. |
| 4,613,937 A | 9/1986 | Batty, Jr. |
| 4,613,938 A | 9/1986 | Hansen et al. |
| 4,649,388 A | 3/1987 | Atlas |
| 4,658,255 A | 4/1987 | Nakamura et al. |
| 4,684,950 A | 8/1987 | Long |
| 4,742,353 A | 5/1988 | D'Addio et al. |
| 4,761,650 A | 8/1988 | Masuda et al. |
| 4,835,536 A | 5/1989 | Piesinger et al. |
| RE33,152 E | 1/1990 | Atlas |
| 4,914,444 A | 4/1990 | Pifer et al. |
| 4,928,131 A | 5/1990 | Onozawa |
| 4,940,987 A | 7/1990 | Frederick |
| 5,036,334 A | 7/1991 | Henderson et al. |
| 5,049,886 A | 9/1991 | Seitz et al. |
| 5,057,820 A | 10/1991 | Markson et al. |
| 5,077,558 A | 12/1991 | Kuntman |
| 5,105,191 A | 4/1992 | Keedy |
| 5,159,407 A | 10/1992 | Churnside et al. |
| 5,164,731 A | 11/1992 | Borden et al. |
| 5,173,704 A | 12/1992 | Buehler et al. |
| 5,177,487 A | 1/1993 | Taylor et al. |
| 5,198,819 A | 3/1993 | Susnjara |
| 5,202,690 A | 4/1993 | Frederick |
| 5,208,587 A | 5/1993 | Cornman |
| 5,208,600 A | 5/1993 | Rubin |
| 5,221,924 A | 6/1993 | Wilson, Jr. |
| 5,262,773 A | 11/1993 | Gordon |
| 5,291,208 A | 3/1994 | Young |
| 5,296,865 A | 3/1994 | Lewis |
| 5,311,183 A | 5/1994 | Mathews et al. |
| 5,311,184 A | 5/1994 | Kuntman |
| 5,331,330 A | 7/1994 | Susnjara |
| 5,396,220 A | 3/1995 | Markson et al. |
| 5,402,116 A | 3/1995 | Ashley |
| 5,469,168 A | 11/1995 | Anderson |
| 5,479,173 A | 12/1995 | Yoshioka et al. |
| 5,485,157 A | 1/1996 | Long |
| 5,517,193 A | 5/1996 | Allison et al. |
| 5,521,603 A | 5/1996 | Young |
| 5,534,868 A | 7/1996 | Gjessing et al. |
| 5,568,151 A | 10/1996 | Merritt |
| 5,583,972 A * | 12/1996 | Miller .................. G01S 13/951 |
| | | 324/640 |
| 5,592,171 A | 1/1997 | Jordan |
| 5,602,543 A | 2/1997 | Prata et al. |
| 5,615,118 A | 3/1997 | Frank |
| 5,648,782 A | 7/1997 | Albo et al. |
| 5,654,700 A | 8/1997 | Prata et al. |
| 5,657,009 A | 8/1997 | Gordon |
| 5,686,919 A | 11/1997 | Jordan et al. |
| 5,726,656 A | 3/1998 | Frankot |
| 5,757,322 A | 5/1998 | Ray et al. |
| 5,771,020 A | 6/1998 | Markson et al. |
| 5,828,332 A | 10/1998 | Frederick |
| 5,831,570 A | 11/1998 | Ammar et al. |
| 5,838,239 A | 11/1998 | Stern et al. |
| 5,839,080 A | 11/1998 | Muller et al. |
| 5,907,568 A | 5/1999 | Reitan, Jr. |
| 5,920,276 A | 7/1999 | Frederick |
| 5,936,552 A | 8/1999 | Wichgers et al. |
| 5,945,926 A | 8/1999 | Ammar et al. |
| 5,973,635 A | 10/1999 | Albo |
| 6,018,307 A * | 1/2000 | Wakayama .............. G01S 13/87 |
| | | 342/179 |
| 6,034,760 A | 3/2000 | Rees |
| 6,043,756 A * | 3/2000 | Bateman .................. G01S 7/003 |
| | | 340/945 |
| 6,043,757 A | 3/2000 | Patrick |
| 6,081,220 A | 6/2000 | Fujisaka et al. |
| 6,138,060 A | 10/2000 | Conner et al. |
| 6,154,151 A | 11/2000 | McElreath et al. |
| 6,154,169 A | 11/2000 | Kuntman |
| 6,177,873 B1 | 1/2001 | Cragun |
| 6,184,816 B1 | 2/2001 | Zheng et al. |
| 6,201,494 B1 * | 3/2001 | Kronfeld .................. G01S 13/95 |
| | | 342/26 R |
| 6,208,284 B1 | 3/2001 | Woodell et al. |
| 6,236,351 B1 * | 5/2001 | Conner .................. G01S 7/2813 |
| | | 342/26 B |
| 6,240,369 B1 | 5/2001 | Foust |
| 6,246,367 B1 | 6/2001 | Markson et al. |
| 6,281,832 B1 | 8/2001 | McElreath |
| 6,289,277 B1 | 9/2001 | Feyereisen et al. |
| 6,297,772 B1 | 10/2001 | Lewis |
| 6,339,747 B1 | 1/2002 | Daly et al. |
| 6,340,946 B1 | 1/2002 | Wolfson et al. |
| 6,377,202 B1 | 4/2002 | Kropfli et al. |
| 6,381,538 B1 | 4/2002 | Robinson et al. |
| 6,384,830 B2 | 5/2002 | Baron et al. |
| 6,388,607 B1 | 5/2002 | Woodell |
| 6,388,608 B1 | 5/2002 | Woodell et al. |
| RE37,725 E | 6/2002 | Yamada |
| 6,405,134 B1 | 6/2002 | Smith et al. |
| 6,424,288 B1 | 7/2002 | Woodell |
| 6,441,773 B1 | 8/2002 | Kelly et al. |
| 6,448,922 B1 | 9/2002 | Kelly |
| 6,456,226 B1 | 9/2002 | Zheng et al. |
| 6,480,142 B1 | 11/2002 | Rubin |
| 6,496,252 B1 | 12/2002 | Whiteley |
| 6,501,392 B2 | 12/2002 | Gremmert et al. |
| 6,512,476 B1 | 1/2003 | Woodell |
| 6,518,914 B1 | 2/2003 | Peterson et al. |
| 6,549,161 B1 | 4/2003 | Woodell |
| 6,560,538 B2 | 5/2003 | Schwinn et al. |
| 6,563,452 B1 | 5/2003 | Zheng et al. |
| 6,577,947 B1 | 6/2003 | Kronfeld et al. |
| 6,590,520 B1 | 7/2003 | Steele et al. |
| 6,597,305 B2 | 7/2003 | Szeto et al. |
| 6,603,425 B1 | 8/2003 | Woodell |
| 6,606,564 B2 | 8/2003 | Schwinn et al. |
| 6,614,382 B1 | 9/2003 | Cannaday et al. |
| 6,650,275 B1 | 11/2003 | Kelly et al. |
| 6,650,972 B1 | 11/2003 | Robinson et al. |
| 6,667,710 B2 | 12/2003 | Cornell et al. |
| 6,670,908 B2 | 12/2003 | Wilson et al. |

(56) References Cited

U.S. PATENT DOCUMENTS

| | | |
|---|---|---|
| 6,677,886 B1 | 1/2004 | Lok |
| 6,683,609 B1 | 1/2004 | Baron et al. |
| 6,690,317 B2 | 2/2004 | Szeto et al. |
| 6,703,945 B2 | 3/2004 | Kuntman et al. |
| 6,720,906 B2 | 4/2004 | Szeto et al. |
| 6,738,010 B2 | 5/2004 | Steele et al. |
| 6,741,203 B1 | 5/2004 | Woodell |
| 6,744,382 B1 | 6/2004 | Lapis et al. |
| 6,771,207 B1 | 8/2004 | Lang |
| 6,788,043 B2 | 9/2004 | Murphy et al. |
| 6,791,311 B2 | 9/2004 | Murphy et al. |
| 6,828,922 B1 | 12/2004 | Gremmert et al. |
| 6,828,923 B2 | 12/2004 | Anderson |
| 6,839,018 B2 | 1/2005 | Szeto et al. |
| 6,850,185 B1 | 2/2005 | Woodell |
| 6,856,908 B2 | 2/2005 | Devarasetty et al. |
| 6,879,280 B1 | 4/2005 | Bull et al. |
| 6,882,302 B1 | 4/2005 | Woodell et al. |
| 6,917,860 B1 | 7/2005 | Robinson et al. |
| 6,977,608 B1 | 12/2005 | Anderson et al. |
| 7,030,805 B2 | 4/2006 | Ormesher et al. |
| 7,039,505 B1 | 5/2006 | Southard et al. |
| 7,042,387 B2 | 5/2006 | Ridenour et al. |
| 7,082,382 B1 | 7/2006 | Rose et al. |
| 7,109,912 B1 | 9/2006 | Paramore et al. |
| 7,109,913 B1 | 9/2006 | Paramore et al. |
| 7,116,266 B1 | 10/2006 | Vesel et al. |
| 7,129,885 B1 | 10/2006 | Woodell et al. |
| 7,132,974 B1 | 11/2006 | Christianson |
| 7,139,664 B2 | 11/2006 | Kelly et al. |
| 7,145,503 B2 | 12/2006 | Abramovich et al. |
| 7,161,525 B1 | 1/2007 | Finley et al. |
| 7,200,491 B1 | 4/2007 | Rose et al. |
| 7,205,928 B1 | 4/2007 | Sweet |
| 7,242,343 B1 | 7/2007 | Woodell |
| 7,259,714 B1 | 8/2007 | Cataldo |
| 7,292,178 B1 | 11/2007 | Woodell et al. |
| 7,307,576 B1 | 12/2007 | Koenigs |
| 7,307,577 B1 | 12/2007 | Kronfeld et al. |
| 7,307,583 B1 | 12/2007 | Woodell et al. |
| 7,307,586 B2 | 12/2007 | Peshlov et al. |
| 7,307,756 B2 | 12/2007 | Walmsley |
| 7,352,317 B1 | 4/2008 | Finley et al. |
| 7,352,929 B2 | 4/2008 | Hagen et al. |
| 7,365,674 B2 | 4/2008 | Tillotson et al. |
| 7,372,394 B1 | 5/2008 | Woodell et al. |
| 7,383,131 B1 | 6/2008 | Wey et al. |
| 7,411,519 B1 | 8/2008 | Kuntman et al. |
| 7,417,578 B1 | 8/2008 | Woodell et al. |
| 7,417,579 B1 | 8/2008 | Woodell |
| 7,427,943 B1 | 9/2008 | Kronfeld et al. |
| 7,436,361 B1 | 10/2008 | Paulsen et al. |
| 7,471,995 B1 | 12/2008 | Robinson |
| 7,486,219 B1 | 2/2009 | Woodell et al. |
| 7,486,220 B1 | 2/2009 | Kronfeld et al. |
| 7,492,304 B1 | 2/2009 | Woodell et al. |
| 7,492,305 B1 | 2/2009 | Woodell et al. |
| 7,515,087 B1 | 4/2009 | Woodell et al. |
| 7,515,088 B1 | 4/2009 | Woodell et al. |
| 7,528,613 B1 | 5/2009 | Thompson et al. |
| 7,541,971 B1 | 6/2009 | Woodell et al. |
| 7,557,735 B1 | 7/2009 | Woodell et al. |
| 7,576,680 B1 | 8/2009 | Woodell |
| 7,581,441 B2 | 9/2009 | Barny et al. |
| 7,598,901 B2 | 10/2009 | Tillotson et al. |
| 7,598,902 B1 | 10/2009 | Woodell et al. |
| 7,633,428 B1 | 12/2009 | McCusker et al. |
| 7,633,431 B1 | 12/2009 | Wey et al. |
| 7,656,343 B1 | 2/2010 | Hagen et al. |
| 7,664,601 B2 | 2/2010 | Daly, Jr. |
| 7,696,920 B1 | 4/2010 | Finley et al. |
| 7,696,921 B1 | 4/2010 | Finley et al. |
| 7,698,058 B2 | 4/2010 | Chen et al. |
| 7,714,767 B1 | 5/2010 | Kronfeld et al. |
| 7,728,758 B2 | 6/2010 | Varadarajan et al. |
| 7,733,264 B1 | 6/2010 | Woodell et al. |
| 7,859,448 B1 | 12/2010 | Woodell et al. |
| 7,868,811 B1 | 1/2011 | Woodell et al. |
| 7,869,953 B1 | 1/2011 | Kelly et al. |
| 7,889,118 B1* | 2/2011 | Finley .................... G01S 7/292 342/118 |
| 7,917,255 B1 | 3/2011 | Finley |
| 7,932,853 B1 | 4/2011 | Woodell et al. |
| 7,973,698 B1 | 7/2011 | Woodell et al. |
| 7,982,658 B2 | 7/2011 | Kauffman et al. |
| 8,022,859 B2 | 9/2011 | Bunch et al. |
| 8,054,214 B2 | 11/2011 | Bunch |
| 8,072,368 B1 | 12/2011 | Woodell |
| 8,081,106 B2 | 12/2011 | Yannone |
| 8,089,391 B1 | 1/2012 | Woodell et al. |
| 8,098,188 B2 | 1/2012 | Costes et al. |
| 8,098,189 B1 | 1/2012 | Woodell et al. |
| 8,111,186 B2 | 2/2012 | Bunch et al. |
| 8,159,369 B1* | 4/2012 | Koenigs .................. G01S 7/062 340/963 |
| 8,217,828 B2 | 7/2012 | Kirk |
| 8,228,227 B2 | 7/2012 | Bunch et al. |
| 8,314,730 B1 | 11/2012 | Musiak et al. |
| 8,332,084 B1 | 12/2012 | Bailey et al. |
| 8,902,100 B1 | 12/2014 | Woodell et al. |
| 9,019,146 B1 | 4/2015 | Finley et al. |
| 9,134,418 B1 | 9/2015 | Kronfeld et al. |
| 9,507,022 B1 | 11/2016 | Breiholz et al. |
| 9,535,158 B1 | 1/2017 | Breiholz et al. |
| 2002/0039072 A1 | 4/2002 | Gremmert et al. |
| 2002/0126039 A1 | 9/2002 | Dalton et al. |
| 2003/0001770 A1 | 1/2003 | Cornell et al. |
| 2003/0025627 A1 | 2/2003 | Wilson et al. |
| 2003/0117311 A1 | 6/2003 | Funai |
| 2003/0193411 A1 | 10/2003 | Price |
| 2004/0183695 A1 | 9/2004 | Ruokangas et al. |
| 2004/0239550 A1 | 12/2004 | Daly, Jr. |
| 2005/0049789 A1 | 3/2005 | Kelly et al. |
| 2005/0174350 A1 | 8/2005 | Ridenour et al. |
| 2005/0222770 A1 | 10/2005 | McKewon et al. |
| 2006/0036366 A1 | 2/2006 | Kelly et al. |
| 2007/0005249 A1 | 1/2007 | Dupree et al. |
| 2007/0152867 A1 | 7/2007 | Randall |
| 2008/0040038 A1* | 2/2008 | Southard .................. G01S 7/003 701/300 |
| 2008/0158049 A1 | 7/2008 | Southard et al. |
| 2008/0169967 A1 | 7/2008 | Wood et al. |
| 2008/0180282 A1 | 7/2008 | Brosius |
| 2009/0177343 A1 | 7/2009 | Bunch et al. |
| 2009/0219197 A1 | 9/2009 | Bunch |
| 2010/0019938 A1 | 1/2010 | Bunch |
| 2010/0019958 A1 | 1/2010 | Bunch et al. |
| 2010/0042275 A1* | 2/2010 | Kirk ...................... G01W 1/08 701/14 |
| 2010/0110431 A1 | 5/2010 | Ray et al. |
| 2010/0194628 A1 | 8/2010 | Christianson et al. |
| 2010/0201565 A1 | 8/2010 | Khatwa |
| 2010/0245164 A1 | 9/2010 | Kauffman |
| 2010/0245165 A1 | 9/2010 | Kauffman et al. |
| 2010/0302093 A1 | 12/2010 | Bunch et al. |
| 2010/0302094 A1 | 12/2010 | Bunch et al. |
| 2010/0315265 A1 | 12/2010 | Smith et al. |
| 2010/0328143 A1 | 12/2010 | Kirk |
| 2010/0332056 A1 | 12/2010 | Kirk |
| 2011/0074624 A1* | 3/2011 | Bunch .................... G01S 7/003 342/26 D |
| 2011/0148692 A1 | 6/2011 | Christianson |
| 2011/0148694 A1 | 6/2011 | Bunch et al. |
| 2012/0029786 A1 | 2/2012 | Calandra et al. |
| 2012/0086596 A1 | 4/2012 | Insanic et al. |
| 2012/0133551 A1 | 5/2012 | Pujol et al. |
| 2012/0139778 A1 | 6/2012 | Bunch et al. |
| 2013/0226452 A1 | 8/2013 | Watts |
| 2013/0234884 A1 | 9/2013 | Bunch et al. |
| 2013/0321442 A1 | 12/2013 | Van Os et al. |
| 2013/0345982 A1 | 12/2013 | Liu et al. |
| 2014/0156133 A1 | 6/2014 | Cullinane et al. |
| 2014/0176362 A1 | 6/2014 | Sneed |
| 2014/0361923 A1 | 12/2014 | Bunch et al. |

(56) References Cited

U.S. PATENT DOCUMENTS

| | | |
|---|---|---|
| 2014/0362088 A1 | 12/2014 | Veillette et al. |
| 2015/0310747 A1 | 10/2015 | Frolik et al. |
| 2016/0180718 A1 | 6/2016 | Shapiro et al. |
| 2016/0266249 A1 | 9/2016 | Kauffman et al. |

FOREIGN PATENT DOCUMENTS

| | | |
|---|---|---|
| WO | WO-98/07047 A1 | 2/1998 |
| WO | WO-98/22834 A1 | 5/1998 |
| WO | WO-03/005060 A1 | 1/2003 |
| WO | WO-2009/137158 | 11/2009 |

OTHER PUBLICATIONS

U.S. Appl. No. 13/919,406, filed Jun. 17, 2013, Rockwell Collins, Inc.
U.S. Appl. No. 14/086,844, filed Nov. 21, 2013, Rockwell Collins, Inc.
U.S. Appl. No. 14/206,239, filed Mar. 12, 2014, Rockwell Collins.
U.S. Appl. No. 14/206,651, filed Mar. 12, 2014, Rockwell Collins, Inc.
U.S. Appl. No. 14/207,034, filed Mar. 12, 2014, Rockwell Collins, Inc.
3-D Weather Hazard and Avoidance System, Honeywell InteVue Brochure dated Nov. 2008, 4 pages.
Bovith et al., Detecting Weather Radar Clutter by Information Fusion with Satellite Images and Numerical Weather Prediction Model Output; Jul. 31-Aug. 4, 2006, 4 pages.
Burnham et al., Thunderstorm Turbulence and Its Relationship to Weather Radar Echoes, J. Aircraft, Sep.-Oct. 1969, 8 pages.
Corridor Integrated Weather System (CIWS), www.ll.mit.edu/mission/aviation/faawxsystems/ciws.html, received on Aug. 19, 2009, 3 pages.
Decision on Appeal for Inter Parties Reexamination Control No. 95/001,860, dated Oct. 17, 2014, 17 pages.
Doviak et al., Doppler Radar and Weather Observations, 1984, 298 pages.
Dupree et al.,FAA Tactical Weather Forecasting in the United States National Airspace, Proceedings from the World Weather Research Symposium on Nowcasting and Very Short Term Forecasts, Toulouse, France, 2005, 29 pages.
Final Office Action on U.S. Appl. No. 13/238,606 dated Apr. 1, 2014, 11 pages.
Final Office Action on U.S. Appl. No. 13/238,606 dated Jan. 22, 2015, 6 pages.
Final Office Action on U.S. Appl. No. 13/246,769 dated Sep. 16, 2014, 18 pages.
Goodman et al., LISDAD Lightning Observations during the Feb. 22-23, 1998 Central Florida Tornado Outbreak, http:www.srh.noaa.gov/topics/attach/html/ssd98-37.htm, Jun. 1, 1998, 5 pages.
Greene et al., Vertically Integrated Liquid Water-A New Analysis Tool, Monthly Weather Review, Jul. 1972, 5 pages.
Hodanish, Integration of Lightning Detection Systems in a Modernized National Weather Service Office, http://www.srh.noaa.gov/mlb/hoepub.html, retrieved on Aug. 6, 2007, 5 pages.
Honeywell, RDR-4B Forward Looking Windshear Detection/Weather Radar System User's Manual with Radar Operation Guidelines, Jul. 2003.
Keith, Transport Category Airplane Electronic Display Systems, Jul. 16, 1987, 34 pages.
Klingle-Wilson et al., Description of Corridor Integrated Weather System (CIWS) Weather Products, Aug. 1, 2005, 120 pages.
Kuntman et al, Turbulence Detection and Avoidance System, Flight Safety Foundation 53rd International Air Safety Seminar (IASS), Oct. 29, 2000.
Kuntman, Airborne System to Address Leading Cause of Injuries in Non-Fatal Airline Accidents, ICAO Journal, Mar. 2000.
Kuntman, Satellite Imagery: Predicting Aviation Weather Hazards, ICAO Journal, Mar. 2000, 4 pps.
Meteorological/KSC/L71557/Lighting Detection and Ranging (LDAR), Jan. 2002, 12 pages.
Nathanson, Fred E., "Radar and Its Composite Environment," Radar Design Principles, Signal Processing and the Environment, 1969, 5 pages, McGraw-Hill Book Company, New York et al.
Non-Final Office Action on U.S. Appl. No. 12/892,663 dated May 29, 2013, 14 pages.
Non-Final Office Action on U.S. Appl. No. 13/238,606 dated Jul. 8, 2014, 12 pages.
Non-Final Office Action on U.S. Appl. No. 13/238,606 dated Sep. 23, 2013, 15 pages.
Non-Final Office Action on U.S. Appl. No. 13/717,052 dated Sep. 9, 2014, 8 pages.
Notice of Allowance on U.S. Appl. No. 12/075,103 dated Aug. 4, 2014, 10 pages.
Notice of Allowance on U.S. Appl. No. 13/246,769 dated Jan. 8, 2015, 10 pages.
Office Action for U.S. Appl. No. 12/892,663, dated Oct. 22, 2012, 12 pages.
Office Action for U.S. Appl. No. 13/717,052, dated Aug. 22, 2013, 15 pages.
Office Action on U.S. Appl. No. 12/075,103 dated Jul. 31, 2013, 8 pages.
Office Action on U.S. Appl. No. 13/246,769 dated Apr. 21, 2014, 18 pages.
Pessi et al., On the Relationship Between Lightning and Convective Rainfall Over the Central Pacific Ocean, date unknown, 9 pages.
RDR-4B Honeywell User Manual for Forward Looking Windshear Detection/Weather Radar System, Rev. 6, Jul. 2003, 106 pps.
Robinson et al., En Route Weather Depiction Benefits of the Nexrad Vertically Integrated Liquid Water Product Utilized by the Corridor Integrated Weather System, 10th Conference on Aviation, Range, and Aerospace Meteorology (ARAM), 2002, 4 pages.
Stormscope Lightning Detection Systems, L3 Avionics Systems, retrieved on Jul. 11, 2011, 6 pages.
TOA Technology, printed from website: http://www.toasystems.com/technology.html on Dec. 29, 2010, 2 pages.
Triangulation, from Wikipedia, printed from website: http://en.wikipedia.org/wiki/Triangulation on Dec. 29, 2010, 6 pages.
Waldvogel et al., The Kinetic Energy of Hailfalls. Part I: Hailstone Spectra, Journal of Applied Meteorology, Apr. 1978, 8 pages.
Wilson et al., The Complementary Use of Titan-Derived Radar and Total Lightning Thunderstorm Cells, paper presented on Oct. 16, 2005, 10 pages.
Zipser et al., The Vertical Profile of Radar Reflectivity and Convective Cells: A Strong Indicator of Storm Intensity and Lightning Probability? America Meteorological Society, 1994, 9 pages.
U.S. Appl. No. 13/246,769, filed Sep. 27, 2011, Rockwell Collins.
U.S. Appl. No. 13/837,538, filed Mar. 15, 2013, Kronfeld et al.
U.S. Appl. No. 14/162,035, filed Jan. 23, 2014, Kevin M. Kronfeld et al.
U.S. Appl. No. 14/323,766, filed Jul. 3, 2014, Weichbrod et al.
U.S. Appl. No. 14/465,730, filed Aug. 21, 2014, Breiholz et al.
U.S. Appl. No. 14/465,753, filed Aug. 21, 2014, Arlen E. Breiholz et al.
U.S. Appl. No. 14/608,071, filed Jan. 28, 2015, Breiholz et al.
Boudevillain et al., 2003, Assessment of Vertically Integrated Liquid (VIL) Water Content Radar Measurement, J. Atmos. Oceanic Technol., 20, 807-819.
Greene et al., 1972, Vertically Integrated Water—A New Analysis Tool, Mon. Wea. Rev., 100, 548-552.
Lahiff, 2005, Vertically Integrated Liquid Density and Its Associated Hail Size Range Across the Burlington, Vermont County Warning Area, Eastern Regional Technical Attachment, No. 05-01, 20 pages.
Liu, Chuntao et al., Relationships between lightning flash rates and radar reflectivity vertical structures in thunderstorms over the tropics and subtropics, Journal of Geophysical Research, vol. 177, D06212, doi:10.1029/2011JDo17123,2012, American Geophysical Union, 2012, 19 pages.
Non-Final Office Action on U.S. Appl. No. 13/238,606 dated May 27, 2015, 14 pages.

(56) References Cited

OTHER PUBLICATIONS

Non-Final Office Action on U.S. Appl. No. 14/452,235 dated Apr. 23, 2015, 9 pages.
Non-Final Office Action on U.S. Appl. No. 14/681,901 dated Jun. 17, 2015, 21 pages.
Non-Final Office Action on U.S. Appl. No. 13/238,606 dated Mar. 27, 2015, 21 pages.
Non-Final Office Action on U.S. Appl. No. 13/717,052 dated Feb. 11, 2015, 15 pages.
Non-Final Office Action on U.S. Appl. No. 13/841,893 dated Jun. 22, 2015, 27 pages.
Non-Final Office Action on U.S. Appl. No. 13/913,100 dated May 4, 2015, 25 pages.
Non-Final Office Action on U.S. Appl. No. 13/919,406 dated Jul. 14, 2015, 23 pages.
Non-Final Office Action on U.S. Appl. No. 14/162,035, dated Feb. 4, 2016, 9 pages.
Non-Final Office Action on U.S. Appl. No. 14/465,753 dated Apr. 4, 2016, 12 pages.
Non-Final Office Action on U.S. Appl. No. 14/086,844, dated Nov. 10, 2015, 17 pages.
Notice of Allowance on U.S. Appl. No. 13/707,438 dated Feb. 25, 2015, 11 pages.
Notice of Allowance on U.S. Appl. No. 14/681,901, dated Dec. 23, 2015, 8 pages.
Zipser, Edward J. et al., The Vertical Profile of Radar Reflectivity of Convective Cells: A Strong Indicator of Storm Intensity and Lightning Probability?, American Meteorological Society, Aug. 1994, 9 pages.
U.S. Appl. No. 13/717,052, filed Dec. 17, 2012, Woodell et al.
Final Office Action on U.S. Appl. No. 13/717,052, dated Nov. 13, 2015, 10 pages.
Final Office Action on U.S. Appl. No. 14/207,034, dated Oct. 13, 2016, 15 pages.
Non-Final Office Action on U.S. Appl. No. 14/162,035 dated Jul. 11, 2016, 10 pages.
Non-Final Office Action on U.S. Appl. No. 14/206,239 dated Jun. 16, 2016, 12 pages.
Non-Final Office Action on U.S. Appl. No. 14/206,651 dated Jun. 23, 2016, 12 pages.
Non-Final Office Action on U.S. Appl. No. 14/207,034 dated Jun. 23, 2016, 14 pages.
Non-Final Office Action on U.S. Appl. No. 14/323,766,, dated Feb. 8, 2017, 21 pages.
Non-Final Office Action on U.S. Appl. No. 14/465,730, dated Oct. 21, 2016, 6 pages.
Non-Final Office Action on U.S. Appl. No. 15/137,645 dated Aug. 8, 2016, 6 pages.
Notice of Allowance on U.S. Appl. No. 14/162,035, dated Nov. 9, 2016, 7 pages.
Notice of Allowance on U.S. Appl. No. 14/465,753, dated Aug. 29, 2016, 8 pages.
Notice of Allowance on U.S. Appl. No. 15/287,673, dated Nov. 18, 2016, 8 pages.
Corrected Notice of Allowance for U.S. Appl. No. 14/323,766 dated Sep. 27, 2017. 2 pages.
Non-Final Office Action for U.S. Appl. No. 14/872942 dated Oct. 6, 2017. 28 pages.

* cited by examiner

ENHANCEMENT OF AIRBORNE WEATHER RADAR PERFORMANCE USING EXTERNAL WEATHER DATA

CROSS-REFERENCE TO RELATED PATENT APPLICATIONS

The present application is related to U.S. patent application Ser. No. 14/465,753 (13CR836 (047141-0985)) filed on Aug. 21, 2014, by Breiholz et al., entitled "Weather Radar System and Method With Fusion of Multiple Weather Information Sources," U.S. patent application Ser. No. 14/162,035 (12CR2418 (047141-0972)) filed on Jan. 23, 2014, by Kronfeld et al., entitled "Weather Radar System and Method With Path Attenuation Shadowing," U.S. patent application Ser. No. 14/086,844 (047141-0960 (13CR664)) filed on Nov. 21, 2013, by Breiholz et al., entitled "Weather Radar System and Method for Estimating Vertically Integrated Liquid Content," U.S. patent application Ser. No. 14/465,730 (13CR665 (047141-0983)) filed on Aug. 21, 2014, by Breiholz et al., entitled "Weather Radar System and Method With Latency Compensation for Data Link Weather Information," U.S. patent application Ser. No. 13/238,606 (11-CR-00116 (047141-0771)) filed on Sep. 21, 2011, by Crosmer et al., entitled "System and Method for Weather Detection Using More Than One Source of Radar Data," and U.S. patent application Ser. No. 12/892,663 (10-CR-00181 (047141-0706)) filed on Sep. 28, 2010, by Kronfeld et al., entitled "System and Method for Weather Detection," all of which are assigned to the assignee of the present application and incorporated herein by reference.

BACKGROUND

The present disclosure relates generally to the field of weather radar systems. More particularly, the present disclosure relates to weather radar systems and methods that enhance airborne weather radar performance based on weather data derived from an external source or combination of external sources.

Weather radar systems are often used to alert operators of vehicles, such as aircraft pilots, of weather hazards in areas near the vehicle, in areas along the vehicle's intended route, at the vehicle's intended final destination, and so on. Such weather radar systems typically include an antenna, a receiver transmitter, a processor, and a display. The weather radar system transmits radar pulses or signals and receives radar return signals indicative of weather conditions. Conventional weather radar systems, such as the WXR 2100 MULTISCAN radar system manufactured by Rockwell Collins, Inc., have Doppler capabilities and can measure or detect parameters such as weather range, weather reflectivity, weather velocity, and weather spectral width or velocity variation. Weather radar systems may also detect outside air temperature, winds at altitude, INS G loads (in-situ turbulence), barometric pressure, humidity, and so on.

Weather radar signals are then processed to provide graphical images to a radar display. The radar display is typically a color display providing graphical images in color that represent the severity of the detected weather. Some aircraft systems also include other hazard warning systems such as a turbulence detection system or a lightning detection system. The turbulence detection system and the lightning detection system can provide indications of the presence of turbulence and lightning, respectively, or other hazards. Conventional weather display systems are configured to display weather data in two dimensions and often operate according to ARINC 453 and 708 standards. Radar displays may display data in various formats and in various views, such as plan views, horizontal views, and vertical views, and may display two-dimensional, three-dimensional, or four-dimensional images.

While aircraft-based weather radar systems may typically provide the most timely and directly relevant weather information to the aircraft crew based on scan time of a few seconds, the performance of aircraft-based weather systems may be limited in several ways. First, typical radar beam widths of aircraft-based weather radar systems are 3 to 10 degrees. Additionally, the range of aircraft-based weather radar systems is typically limited to about 300 nautical miles, and typically most effective within about 80-100 nautical miles. Further, aircraft-based weather radar systems may be subject to ground clutter when the radar beam intersects with terrain, or to path attenuation due to intense precipitation or rainfall.

While the U.S. National Weather Service WSR-88D Next Generation Radar (NEXRAD) radar system and other external data sources have provided significant advancements in the detection and forecasting of weather, externally-received data may include gaps where no data is collected. For example, NEXRAD data may be incomplete or otherwise be missing data due to cone of silence and umbrella of silence regions, insufficient update rates, geographic limitations, or terrain obstructions. Similarly, weather observations and ground infrastructure are conventionally limited over oceans and less-developed land regions. In some instances, weather data received from multiple sources, such as aircraft-based weather radar systems, ground radar systems, satellite systems, and so on, can be combined to provide a better overall representation of current and forecasted weather conditions as well as information that is more complete than weather data derived from one such source. In this way, the range and accuracy of data displayed on aircraft-based weather radar systems may be improved in certain conditions. However, combining weather data from various sources may not provide a complete representation of weather conditions near an aircraft based, for example, on the existence of gaps across all data sources or based on accuracy or other limitations of the external weather data sources.

Aircraft may receive weather data from a variety of external sources, such as ground radar systems, ground lightening detection networks, atmospheric sounding analyses and forecast systems, satellite systems, and other aircraft. For example, aircraft may receive weather information from the NEXRAD radar system, the U.S. Geostationary Operational Environmental Satellite system (GOES), or the Polar Operational Environmental Satellite system (POES). Information provided by aircraft weather radar systems may be used in conjunction with weather information received from external sources to, for example, provide a more complete image of weather conditions on displays, including improved range and accuracy and a reduction of gaps in radar coverage. For example, the NEXRAD weather radar system is conventionally used for the detection of and warning of severe weather conditions in the United States. NEXRAD data is typically more complete than data from aircraft-based weather radar systems due to its use of volume scans of up to 14 different elevation angles with a one degree beam width. Similarly, the National Lightning Detection Network (NLDN) may typically be a reliable source of information for weather conditions exhibiting intense convection. Weather satellite systems, such as the GOES and POES systems, may provide more current data at a much larger range than aircraft-based weather radar systems.

Aircraft may also receive other types of weather data from external sources as well, including Vertically Integrated Liquid Water (VIL) data, Composite Reflectivity (CR) data, data derived from the Storm Cell Identification and Tracking (SCIT) algorithm and/or the Hail Algorithm, Atmospheric Sounding Analyses and Forecasts data, the Freezing Level & −20° C. Level, the Tropopause Level, and a variety of data derived from indices including Convective Available Potential Energy (CAPE), Convective Inhibition (CIN), Equilibrium Level (EL), K Index (KI), Lifted Index (LI), Showalter Stability Index (SSI), Severe Weather Threat SWEAT Index, Total Totals Index (TT), among others.

What is needed is improved systems and methods for enhancing aircraft-based weather radar performance using external data. What is also needed are systems and methods for increasing the accuracy of aircraft-based weather radar systems. What is further needed are systems and methods for configuring aircraft-based weather radar systems based on weather data received from external sources. What is still further needed are systems and methods for classifying weather data acquired by aircraft-based weather radar systems based on weather data received from external sources.

SUMMARY OF THE INVENTION

One embodiment of the present disclosure relates to a weather radar control system that includes a communications system and a processor. The communications system includes a transmitter-receiver that is configured to receive first weather data from an external location. The first weather data includes a first weather condition, a location of the first weather condition, and a time of sensing the first weather condition. The processor includes a control module coupled with the communications system and configured to determine a point of interest based on the first weather data; acquire, by controlling an onboard weather radar system, second weather data at the point of interest; provide an data representative of weather near the point of interest based at least in part on the second weather data; and transmit, by the transmitter-receiver, the data representative of weather near the point of interest to an external weather radar system.

Another embodiment of the present disclosure relates to a weather radar system that includes a communications system and a processor. The communications system includes a transmitter-receiver configured to receive first weather data indicative of a characteristic of a first weather condition from an external location. The processor includes a control module coupled with the communications system and configured to determine an operation parameter of an onboard weather radar system based on the characteristic of the first weather condition; control operation of the onboard weather radar system based on the operation parameter; and transmit, by the transmitter-receiver, the data representative of weather near the point of interest to an external weather radar system.

Another embodiment of the present disclosure relates to a method of controlling a weather radar system. The method includes receiving, by a communications module, first weather data indicative of a characteristic of a first weather condition from an external location. The method further includes determining, by the control module, an operation parameter of an onboard weather radar system based on the characteristic of the first weather condition. The method further includes controlling, by the control module, the onboard weather radar system based on the operation parameter.

BRIEF DESCRIPTION OF THE DRAWINGS

The disclosure will become more fully understood from the following detailed description, taken in conjunction with the accompanying drawings, wherein like reference numerals refer to like elements, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting. As discussed below, the systems and methods can be utilized in a number of control systems for various types of applications or sensing systems. For example, in some embodiments, the systems and methods of the present disclosure may be used for a flight display of an aircraft. According to various other exemplary embodiments, the systems and methods of the present disclosure may be used by any system in any other embodiment for controlling an aircraft, controlling a weather radar system, rendering computer graphics and displaying an output (e.g., in another aircraft or spacecraft, a ground-based vehicle, or in a non-vehicle application such as a ground-based display system, air traffic control system, or radar system), and so on.

Figure 1A:
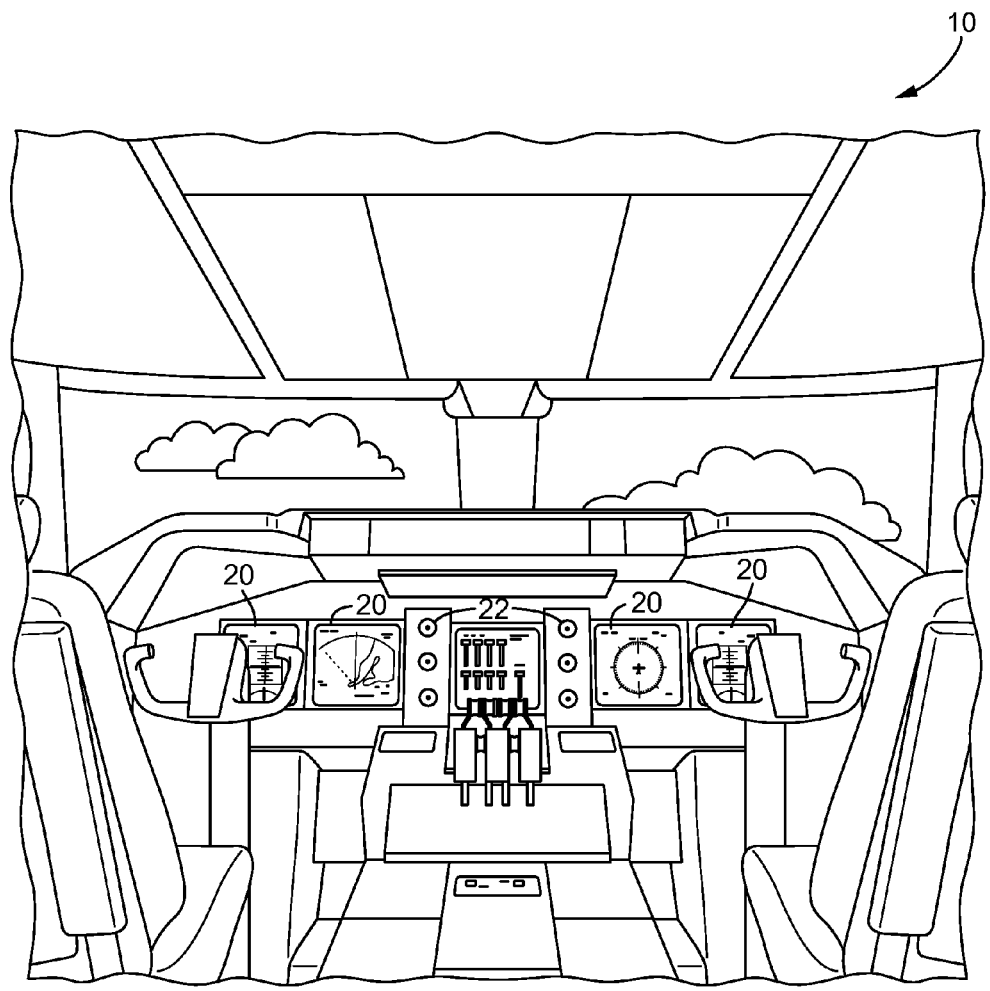
FIG. 1A is a perspective view schematic of an exemplary aircraft control center or cockpit.

Referring to FIG. 1A, an exemplary aircraft control center or cockpit 10 for an aircraft is shown. Aircraft control center 10 may include one or more flight displays 20. Flight displays 20 may be implemented using any of a variety of display technologies, including CRT, LCD, organic LED, dot matrix display, and others. Flight displays 20 may be navigation (NAV) displays, primary flight displays, electronic flight bag displays, tablets such as iPad® computers manufactured by Apple, Inc. or tablet computers, synthetic vision system displays, head up displays (HUDs) with or without a projector, wearable displays, etc. Flight displays 20 may be used to provide information to the flight crew, thereby increasing visual range and enhancing decision-making abilities. One or more flight displays 20 may be configured to function as, for example, a primary flight display (PFD) used to display altitude, airspeed, vertical speed, and navigation and traffic collision avoidance system (TCAS) advisories. One or more flight displays 20 may also be configured to function as, for example, a multi-function display used to display navigation maps, weather radar, electronic charts, TCAS traffic, aircraft maintenance data and electronic checklists, manuals, and procedures. One or more flight displays 20 may also be configured to function as, for example, an engine indicating and crew-alerting system (EICAS) display used to display critical engine and system status data. Other types and functions of flight displays 20 are contemplated as well. According to various exemplary embodiments, at least one of flight displays 20 may be configured to provide a rendered display from the systems and methods of the present disclosure.

In some embodiments, flight displays 20 may provide an output based on data received from a system external to the aircraft, such as a ground-based weather radar system, satellite-based system, or from a system of another aircraft. In some embodiments, flight displays 20 may provide an output from an onboard aircraft-based weather radar system, LIDAR system, infrared system or other system on the aircraft. For example, flight displays 20 may include a weather display, a weather radar map and a terrain display. In some embodiments, flight displays 20 may provide an output based on a combination of data received from multiple external systems or from at least one external system and an onboard aircraft-based system. Further, flight displays 20 may include an electronic display or a synthetic vision system (SVS). For example, flight displays 20 may include a display configured to display a two-dimensional (2-D) image, a three dimensional (3-D) perspective image of terrain and/or weather information, or a four dimensional (4-D) display of weather information or forecast information. Other views of terrain and/or weather information may also be provided (e.g., plan view, horizontal view, vertical view, etc.). The views may include monochrome or color graphical representations of the terrain and/or weather information. Graphical representations of weather or terrain may include an indication of altitude of the weather or terrain or the altitude relative to the aircraft.

Aircraft control center 10 may include one or more user interface (UI) elements 22. UI elements 22 may include, for example, dials, switches, buttons, touch screens, keyboards, a mouse, joysticks, cursor control devices (CCDs) or other multi-function key pads, etc. In many cases, UI elements 22 will be certified for use with avionics systems. UI elements 22 may be configured to, for example, allow an aircraft crew member to interact with various avionics applications and perform functions such as data entry, manipulation of navigation maps, and moving among and selecting checklist items. For example, UI elements 22 may be used to adjust features of flight displays 20, such as contrast, brightness, width, and length. UI elements 22 may also (or alternatively) be used by an occupant to interface with or change the data displayed on flight displays 20. UI elements 22 may additionally be used to acknowledge or dismiss an indicator provided by flight displays 20. Further, UI elements 22 may be used to correct errors on the electronic display. Other UI elements 22, such as indicator lights, displays, display elements, and audio alerting devices, may be configured to warn of potentially threatening conditions such as severe weather, terrain, obstacles, or potential collisions with other aircraft, and so on.

Figure 1B:
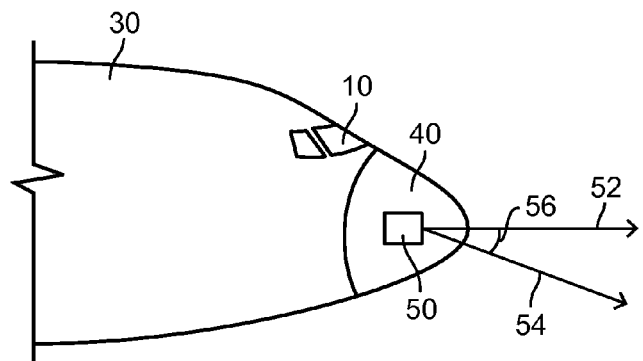
FIG. 1B is a side view schematic illustration of the front of an exemplary aircraft with an aircraft control center and nose.

Referring to FIG. 1B, a side-view schematic illustration of an exemplary aircraft 30 with aircraft control center 10 and a nose 40 for a weather radar system is shown. In the illustrated embodiment, a radar system 50, such as a weather radar system or other radar system, is generally located inside nose 40 of aircraft 30 or inside a cockpit of aircraft 30. According to other exemplary embodiments, radar system 50 may be located anywhere on aircraft 30, such as on the top of aircraft 30, on the belly of aircraft 30, on the tail of aircraft 30, or on either or both sides of aircraft 30. Furthermore, the various components of radar system 50 may be distributed at multiple locations throughout aircraft 30. Additionally, radar system 50 may include or be coupled to an antenna system of aircraft 30. Radar system 50 or other equipment aboard aircraft 30 may also be configured to receive weather data from other sources. For example, radar system 50 or other equipment aboard aircraft 30 may receive weather data from ground-based weather radar systems, satellite-based systems, and from aircraft-based system of other aircraft. Radar system 50 may be any radar system configured to detect or receive data for the systems and methods of the present disclosure. According to exemplary embodiments, radar system 50 may be an RTA-4218 MULTISCAN radar system, a WXR-2100 MULTISCAN radar system, or similar system manufactured by Rockwell Collins, Inc., and configured in accordance with the principles described herein.

Radar system 50 may generally work by sweeping a radar beam horizontally back and forth across the sky. For example, radar system 50 may conduct a first horizontal sweep 52 directly in front of the aircraft and a second horizontal sweep 54 downward at a tilt angle 56 (e.g., 20 degrees downward). Returns from different tilt angles may be electronically merged to form a composite image for display on an electronic display, such as a flight display 20 in aircraft control center 10. Returns may also be processed to, for example, distinguish among terrain, weather, and other objects, to determine the height of the terrain, to determine the height of the weather, etc.

Radar system 50 may also sweep a radar beam vertically back and forth. In some embodiments, radar system 50 may sweep a radar beam vertically back and forth at varying vertical tilt angles. Results from the different vertical tilt angles may be analyzed to determine the characteristics of weather. For example, the altitude, range, and vertical height of weather conditions may be determined using the vertical scan results. The vertical scan results may be used to form an image for display on an electronic display (e.g., flight display 20, etc.). For example, a vertical profile view of the weather may be generated and provided to flight crew on the flight display 20. The profile may be used by a pilot to determine height, range, hazards and threats, and other relevant information that may be utilized by an aircraft crew member to evaluate a current course or to change the course of the aircraft to avoid the detected weather condition.

Figure 2:
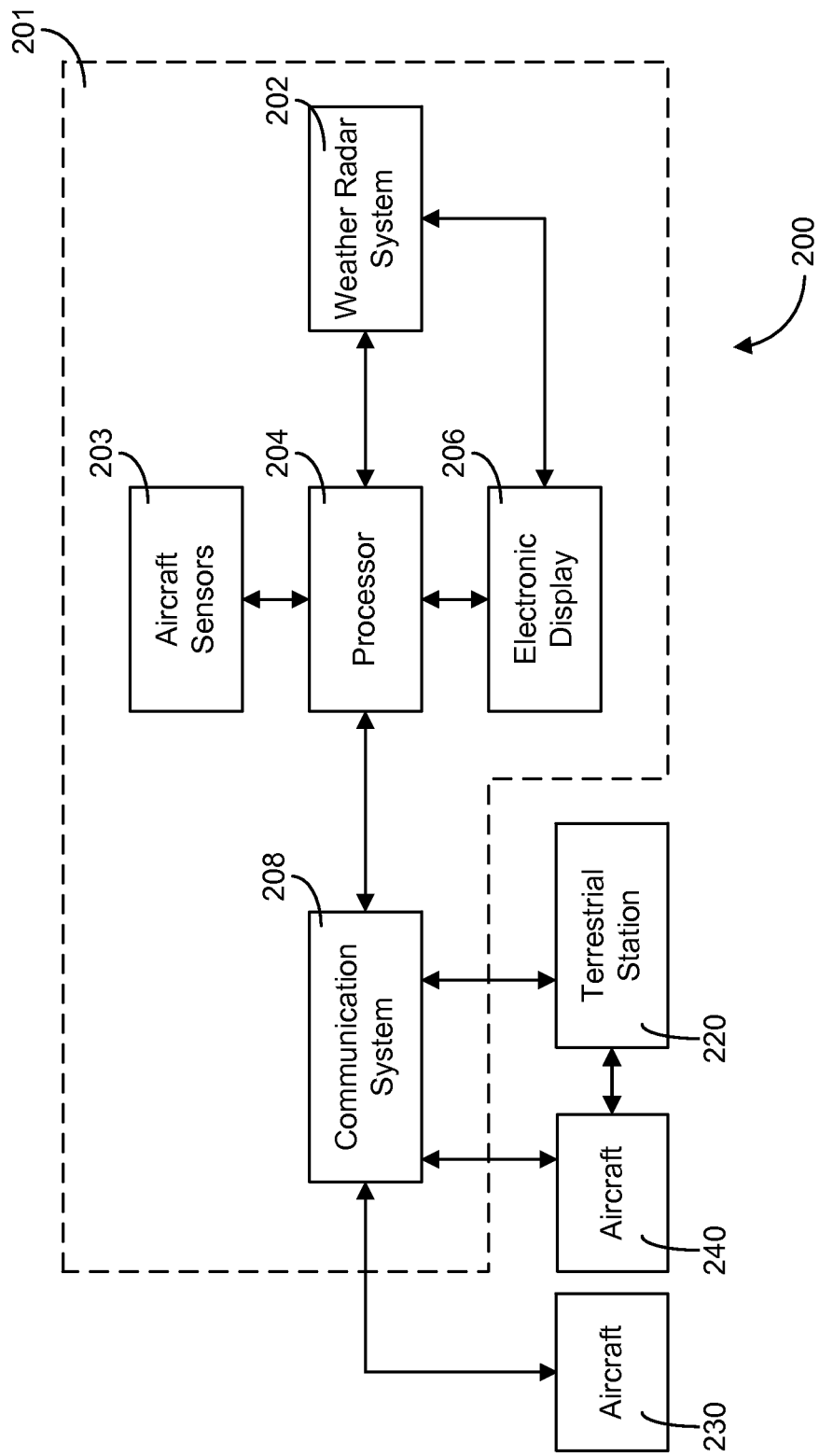
FIG. 2 is a block diagram of the exemplary weather radar system of FIG. 1B.

Referring to FIG. 2, a block diagram of an exemplary weather detection system 200 that may be used, for example, on an aircraft 201 or other vehicle is shown. System 200 may include a weather radar system 202 (e.g., a system similar to radar system 50), aircraft sensors 203, electronics (such as a processor 204), an electronic display system 206 (e.g., a display similar to flight display 20), and a communication system 208. The communication system 208 may be configured to communicate with external systems, such as other aircraft 230, 240 and a terrestrial station 220. Weather radar system 202 is generally configured to cast one or more radar signals from an aircraft mounted antenna, to receive returns, and to interpret the returns (e.g. for display to a user, for transmission to an external weather system, etc.). In some embodiments, weather radar system 202 is configured to receive weather data via communication system 208 and processor 204 from external systems, such as ground-based weather radar systems (e.g., terrestrial station 220), satellite systems, and the systems of other aircraft (e.g., aircraft 230, 240).

Additionally, weather radar system 202 may perform multiple radar sweeps. The radar sweeps may include horizontal sweeps, vertical sweeps, or a combination of horizontal and vertical sweeps. Furthermore, the radar sweeps can be performed such that they are substantially orthogonal to one another. According to other exemplary embodiments, weather radar system 202 can be a monopulse radar system, a sequential lobing system, or a radar system with an aperture capable of switching modes. Aircraft sensors 203 may include, for example, one or more airspeed sensors, location tracking sensors (e.g., GPS, etc.), lightning sensors, turbulence sensors, pressure sensors, optical systems (e.g., camera system, infrared system), outside air temperature sensors, winds at altitude sensors, INS G load (in-situ turbulence) sensors, barometric pressure sensors, humidity sensors, fuel sensors, or any other aircraft sensors or sensing systems that may be used to monitor the performance of an aircraft or weather local to or remote from the aircraft. Data from aircraft sensors 203 may be output to processor 204 for further processing and display, for input to weather radar system 202, or for transmission to a station 220 (e.g., a ground-based weather radar system or terrestrial station such as terrestrial station 220, air traffic control services system, or other terrestrial station), satellite, or to other aircraft 230, 240 via communication system 208. Data collected from external systems (e.g., terrestrial station 220, etc.) may also be processed by processor 204 to configure the collected data for display, provide the data to weather radar system 202 to be processed and used to control aspects of weather radar system 202.

Weather radar system 202 may be a system for detecting weather patterns. Detected weather patterns may be communicated to electronic display system 206 for display to the flight crew. In addition, data from an external station (e.g., terrestrial station 220, a satellite system, another aircraft 230, 240, etc.) may be displayed on display system 206. Detected weather patterns may instead or may also be provided to electronics or processor 204 for further analysis, for use in automated functions, or for transmission to an external system (e.g., terrestrial station 220, a satellite system, another aircraft 230, 240, etc.) via communication system 208.

In some embodiments, aircraft 201 and/or other aircraft 230, 240 may scan in specific areas to improve detection accuracy of weather based on data received via communication system 208 from an external source (e.g., terrestrial station 220). For example, the aircraft weather radar system 202 may adjust its own tilt angle to improve the likelihood of detecting weather based on receiving the Freezing Level and Tropopause Level from terrestrial station 202. In some embodiments, systems aboard aircraft 201 and/or other aircraft 230,240 may scan in specific areas based on further processing and/or analysis of the received data. In some embodiments, the external source may request or direct aircraft 201, and/or other aircraft 230, 240 via communication system 208 to scan in specific areas. Alternatively, weather radar system 202 may request or direct that station 220 and other aircraft 230, 240 direct a scan towards weather of interest to aircraft 201 (e.g., weather in the flight path of aircraft 201) to improve weather detection accuracy. The scans performed by weather radar system 202 and the requests may be transmitted to station 220 or another aircraft 230, 240 via communication system 208.

Figure 3:
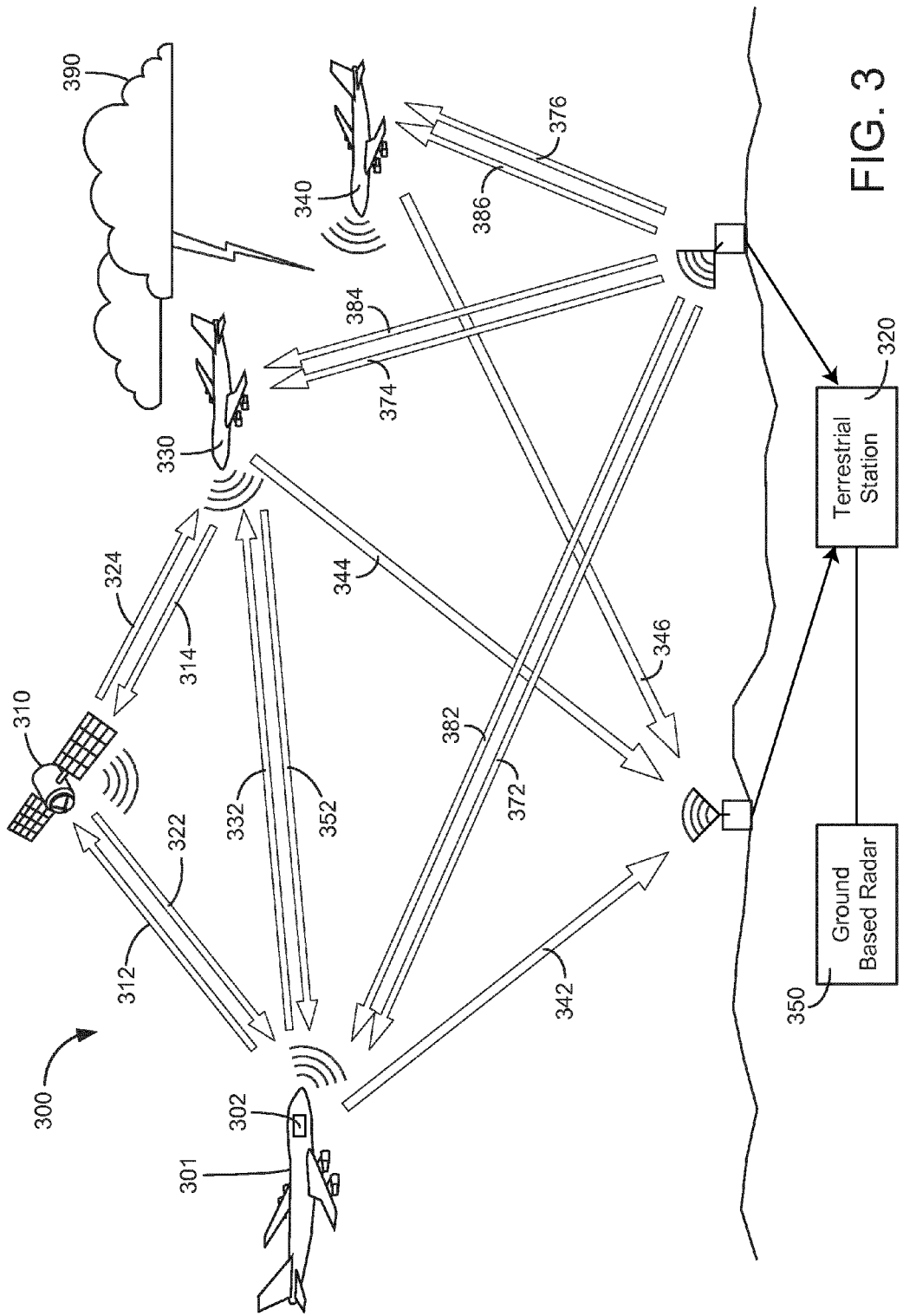
FIG. 3 is a diagram of an exemplary aircraft communications system for a weather radar control system.

Referring to FIG. 3, an exemplary aircraft communications system 300 is shown. System 300 may facilitate communications among an aircraft 301 having weather radar system 302 aboard (e.g., aircraft-based weather radar system 202), a ground-based data center or terrestrial station 320 (e.g., terrestrial station 220), a satellite 310, and other aircraft, such as an aircraft 330 and an aircraft 340 (e.g., other aircraft 230, 240). Station 320 may receive weather data via a channel 342 from aircraft 301, via a channel 344 from aircraft 330, via a channel 346 from aircraft 340, and via a channel from satellite 310. System 300 may utilize data and communications from more than three aircraft and from more than one satellite even though only three aircraft and one satellite are shown in FIG. 3. Additional data may be received from ground based radar 350 from a wireless or wired channel. Station 320 may provide data to aircraft 301 via a channel 372, to aircraft 330 via channel 374, to aircraft 340 via channel 376, and to satellite 310 via a channel. Station 320 may also provide scheduling data and other control data to aircraft 301 via a channel 382, to aircraft 330 via a channel 384, and to aircraft 340 via a channel 386. Satellite 310 may provide data to aircraft 301 via a channel 322, to aircraft 330 via channel 324, and to other aircraft or ground stations. Satellite 310 may further receive data from aircraft 301 via channel 312 and from aircraft 330 via channel 314, as well as from other aircraft, ground stations, and other satellites.

Various types of channels may be utilized including virtual channels, radio channels, satellite channels, etc. The channels may be bi-directional or uni-directional. Channels may be satellite link channels, VHF channels, INMARSAT channels, etc. Any type of wireless communications may be utilized. Various types of communication protocols, including network and ad hoc network protocols may be used to perform communication operations and establish the channels in FIG. 3.

The weather data exchanged among ground station 320, satellite 310, and aircraft 301, 330, and 340 may be in a number of forms. For example, the weather data may include radar data containing any of the data types described herein, including location information, motion vector data, time of sensing information, measured parameter values for a weather condition 390, and so on. The location information may be in, for example, a format based on azimuth, elevation, and range from the radar system or another fixed reference point, in a rectangular grid format, a polygon grid format, a georegistered format, or other format. In some embodiments, the information may be based on coordinates of vertices with reference to a grid (e.g., a latitude, longitude, and elevation grid). In some embodiments, radar data may be based on a representation of range and azimuth. The radar data may also include radar characteristics associated with the radar used to provide the radar data. The characteristics may include an indication of band-type, radar quality, tilt angle, etc. In some embodiments, station 320 may adjust the radar data based on the band-type characteristic (e.g., to provide consistency when comparing data from radar systems using different band-types, such as S or C bands).

In some embodiments, the weather data may be provided from a plurality of sources. Such weather data may also be indicative of one or more types of weather conditions. For example, weather data may be indicative of convective weather systems (e.g., thunderstorms), turbulence, winds aloft, icing, hail, volcanic ash, etc. In some embodiments, data regarding convective weather systems may be provided from a ground-based weather system such as NEXRAD or a satellite-based weather system such as the U.S. Geostationary Operational Environmental Satellite system (GOES) or the Polar Operational Environmental Satellite system (POES). Such data may include IDs for an adaptable number of weather cells, which may be segmented (e.g., delivered in polygon format) weather cells identified in a series of radar volume scans. Individual weather cells may be, for example, 3-D regions of significant reflectivity or other values above one or more specified threshold values. Individual weather cells may be composed of reflectivity radial run segments, and in turn, 2-D weather components composed of segment groups and occurring at different radar elevation angles. Weather components with calculated centroids may be vertically correlated into a cell with an established centroid. Such weather cell data may also include individual data points and trends for each weather cell. For example, current weather cell location may be provided with azimuth, range, direction, and speed information, such as a motion vector using polar and/or Cartesian coordinates along with an estimate of any tracking errors. Other information may be included, for example, storm base height, storm top height, maximum reflectivity, height of maximum reflectivity, probability of hail, probability of severe hail, cell-based vertically integrated liquid (VIL) content, enhanced echo tops (EET) and centroid height, among other information types described in further detail herein. Weather tracking data may be generated by monitoring movement of weather cells and matching cells in current and prior volume scans. Forecast data may be generated by predicting future centroid locations based on prior volume scans, and growth, decay, and/or shape change estimates. Average data for multiple weather cells may be provided as well (e.g., average motion vector data). The weather data may be provided as, for example, a table of alphanumeric values, and/or as a stand-alone display or graphical overlay.

In some embodiments, the aircraft-based weather radar system 202 onboard aircraft 201 may be controlled and/or configured based on data received from an external source (e.g., terrestrial station 220, 320, other aircraft 230, 240, satellite 310, etc.). In one exemplary embodiment, weather radar system 202 may include a communications module (e.g., communication system 208) that is configured to receive first weather data from an external location. The first weather data may include a first weather condition, a location of the first weather condition, and a time of sensing the first weather condition. For example, the weather data may indicate high levels of convection at a specific latitude and longitude near the flight path of aircraft 201 and indicate that the data was acquired at a specific time. The weather radar system 202 may further include a control module (e.g., processor 204) that is configured to determine a point of interest based on the first weather data. For example, the point of interest may be based on the first weather condition and may indicate severe lightening. The control module may further be configured to acquire, by controlling an onboard weather radar system (e.g., weather radar system 202), second weather data at the point of interest. For example, based on the time that the external data source acquired the first weather data, the control module may control the weather radar system 202 to acquire second weather data at the same location if the first weather data is no longer current. The control module may even further be configured to provide an image (e.g., via electronic display system 206) representative of weather near the point of interest based at least in part on the second weather data.

In some embodiments, the aircraft-based weather radar system 202 onboard aircraft 201 may be controlled and/or configured based on an operation parameter determined based on data received from an external source (e.g., terrestrial station 220, 320, other aircraft 230, 240, satellite 310, etc.). The weather radar system 202 may include a communications module configured to receive first weather data indicative of a characteristic of a first weather condition from an external location (e.g., terrestrial station 220, a satellite system, other aircraft 230, 240, etc.). For example, the communications module may receive pilot reports (PIREPs), which are used to indicate turbulence, or may receive nowcast and/or forecast data from weather satellite systems to track volcanic ash cloud behavior, flocks of birds, etc. In another example, the communications module may receive weather data from nowcasting weather data sources, such as the Corridor Integrated Weather System (CIWS). The weather radar system 202 may further include a control module configured to determine an operation parameter of an onboard weather radar system based on the characteristic of the first weather condition, and configured to control operation of the onboard weather radar system based on the operation parameter.

In some embodiments, the onboard weather radar system 202 may be configured to focus its scans on particular cells identified during broad sweeps and/or identified using weather data received from external sources. For example, data received from external sources may be used to determine a point of interest or an operational parameter that focuses the onboard weather radar system 202 to focus on gathering weather data on storms for which ground data is not current. In some embodiments, onboard weather radar system 202 may be configured and/or controlled using an operation parameter based on weather data received from external sources in various ways, such as to vary the pulse widths of the onboard weather radar system 202 based on the type of cells forecasted. For example, the determined operation parameter may define the area of a weather cell, and the control module may vary the pulse width of the onboard weather radar system 202 based thereon, in which a wider pulse width is used when acquiring weather data from large areas of weather and shorter pulses are used when acquiring weather data from small air mass storms. The onboard weather radar system 202 may be further configured and/or controlled using an operation parameter to modify a number of pulses, pulse width, and pulse repetition frequency to focus radar returns on acquiring turbulence data, or to modify internal processing of radar data based on the environment by incorporating algorithms to more accurately process and analyze weather. For example, the determined operation parameter may modify the internal processing of radar data based on a low convective available potential energy or low convective activity levels by incorporating algorithms to more accurately process and analyze data relating to stratiform weather cells. The onboard weather radar system 202 may be further configured and/or controlled using an operation parameter to manage antenna scans to perform sector scans in areas of greatest interest, thereby reducing time spent scanning areas where storms are not likely to arise. The onboard weather radar system 202 may be further configured and/or controlled using an operation parameter to allocate and control the extent of vertical scans to efficiently derive information on storms not well characterized by the external data, thereby avoiding wasteful aircraft-based radar scans in areas where the external data is current or most up-to-date (effectively allocating scans to areas where weather data is least current). Based on external data, the onboard weather radar system 202 may be further configured and/or controlled to avoid the replication of data when data received from external sources is sufficiently up-to-date, acquire weather data in areas where threats are most likely to occur, limit the samples or scans of the onboard weather radar system 202 to acquire data within an area defined by external data (e.g., limit vertical samples so that they do not extend beyond the tops of clouds), optimize transmission signals based on the type of weather anticipated, and classify the weather data acquired by the onboard weather radar system 202 (e.g., classify non-precipitation targets identified by satellites).

The onboard weather radar system 202 may be configured and/or controlled using an operation parameter determined based on data received from an external location, including terrestrial station 220, a satellite system, or other aircraft 230, 240. In some embodiments, weather radar system 202 may receive weather data relating to, and classify weather returns or determine an operation parameter or point of interest based on, echo tops and/or enhanced echo tops, in some cases arranged on a rectangular or polar grid. The onboard weather radar system 202 may identify the highest echo tops and the locations of the highest echo tops from the uplinked data to focus radar scans on the same regions. For example, the onboard weather radar system 202 may perform vertical sweeps in regions having echo tops above a threshold to acquire second weather data indicative of the current storm top height. In another example, based on the uplinked echo top data being very recent (e.g., 5 minutes, 15 minutes, etc.), the onboard weather radar system 202 may adopt the uplinked data for the regions with very recent external data to more efficiently focus its scans on areas where the external data is less timely. In another example, if external data indicates that convective potential for a particular location is low or that convective activity is unlikely to occur, onboard weather radar system 202 may be configured and/or controlled to search for other weather conditions, such as for example, non-threatening stratiform rain showers.

In some embodiments, weather radar system 202 may receive weather data relating to, and classify weather returns or determine an operation parameter or point of interest based on, Vertically Integrated Liquid Water data (VIL) or Composite Reflectivity data (CR). VIL and CR may be used by the onboard weather radar system 202 to identify storm cells that the onboard weather radar system 202 missed in previous scans or would otherwise miss due to the onboard weather radar system's antenna tilt angles, the action of ground clutter suppression algorithms, or due to other effects. The control module may classify weather returns or determine an operation parameter or point of interest based on identifying these types of cells and can control operation of the onboard weather radar system 202 based thereon (e.g., to attempt to gather data on the identified cells, etc.). In some embodiments, the onboard weather radar system 202 may filter the VIL and CR data so that resources are not devoted to storm cells that are below a threshold intensity where the storm cells constitute a threat or that are not threatening to the aircraft for other reasons.

In some embodiments, weather radar system 202 may receive weather data relating to, and classify weather returns or determine an operation parameter or point of interest based on, Storm Structure, Storm Tracking Information, and Hail Index, each of which are based on data derived from the Storm Cell Identification and Tracking (SCIT) algorithm. The SCIT algorithm computes the centroid of each storm cell, the position of the centroid, the altitude of the storm base and storm top, the cell-based vertically integrated liquid water, the maximum reflectivity, and the height of the maximum reflectivity, each of which may be provided to the onboard weather radar system 202 as part of a Storm Structure product. In some embodiments, each cell is correlated to cells from past scans to form storm tracks, which can be used to extrapolate future movement of the storm cells, which is then reported in the Storm Tracking Information along with the inferred velocity of each cell. The Hail Algorithm may use information from the SCIT algorithm to identify areas where hail appears to be present in cells and to estimate the probable size of hail when the hail reaches the ground. In some cases, the presence of large hail may be an indicator of storm severity even in cases where the aircraft is above the altitude of the hail, and can be an efficient tool to help focus the onboard weather radar system's resources on areas where the weather is most active and to efficiently focus scans on, and further track, cells of interest. In some embodiments, the control module may control the tilt angles of the onboard weather radar system 202 based on Hail Index data. For example, the control module may control the onboard weather radar system 202 to scan at a particular point of interest based on Hail Index data indicating that hail is present at the particular point of interest.

In some embodiments, weather radar system 202 may receive weather data relating to, and classify weather returns or determine an operation parameter or point of interest based on, lightning data, such as lightning data provided by ground lightning detection networks or the NLDN. Such data may include indications of individual discharges or flash rates in a given area. In some embodiments, weather radar system 202 may receive lightning data, which may indicate severe convective activity. In some cases, individual strokes of lightning can be early indicators that convection is building up for a severe weather condition. In some embodiments, the control module may control operation of the onboard weather radar system based on the lightening data to, for example, focus the scans of the onboard weather radar system 202 on regions where convection exceeds or is likely to exceed a threshold value.

In some embodiments, weather radar system 202 may receive weather data relating to, and classify weather returns or determine an operation parameter or point of interest based on, Atmospheric Sounding Analyses and Forecasts data, such as the Freezing Level & −20° C. Level and the Tropopause Level, which may be used to configure, adjust, and/or control the onboard weather radar system 20 to maximize the likelihood of detecting convective weather. For example, the Freezing Level & −20° C. Level typically indicate the band in which water-coated ice is likely to occur, and which in turn indicates convective activity. Therefore, in some embodiments, the operation parameter may be based on the Freezing Level & −20° C. Level and may be used by the control module to direct the onboard weather radar system 202 to scan these areas. The Tropopause Level may indicate an end level to the convective rising of the storm cloud. In some embodiments, the operation parameter may be based on the Tropopause Level and may limit the scans of the onboard weather radar system to scan below this level.

In some embodiments, weather radar system 202 may receive weather data relating to, and classify weather returns or determine an operation parameter or point of interest based on, a variety of indices that characterize the probability of convective activity and how severe the convective activity may be should convective activity occur. The operation parameter or point of interest may be based on any number of indexed data types, including but not limited to Convective Available Potential Energy (CAPE), Convective Inhibition (CIN), Equilibrium Level (EL), K Index (KI), Lifted Index (LI), Showalter Stability Index (SSI), Severe Weather Threat SWEAT Index, and the Total Totals Index (TT). These indexed data types may be used by a weather radar system (e.g., onboard weather radar system 202) to focus on a likely area of convective weather, to limit the scan area of the radar system, to increase the sensitivity of the onboard weather radar system, and so on. In some embodiments, the control module may classify weather returns or determine an operation parameter or point of interest based on CAPE values, which may correlate to atmospheric stability. For example, in one embodiment, a 0 CAPE value may indicate stable atmospheric conditions, a 0-1000 CAPE value may indicate marginally unstable atmospheric conditions, a 1000-2500 CAPE value may indicate moderately unstable atmospheric conditions, a 2500-3500 CAPE value may indicate very unstable atmospheric conditions, and a 3500 or greater CAPE value may indicate extremely unstable atmospheric conditions. For example, based on detecting a first weather cell having a 100 CAPE value and a second weather cell having a 3500 CAPE value, the onboard weather radar system 202 may direct scans to the second weather cell because the second weather cell may affect the aircraft's flight route or may pose greater risks than the first weather cell. In one embodiment, if an aircraft is approaching a region where no storms are currently occurring but CAPE is high, the aircraft's onboard weather radar system can be adjusted to search for small cells that could mark the inception of a rapidly growing storm. In some embodiments, CIN data may be used in combination with CAPE data to set the search strategy of onboard weather radar system 202 based on the likelihood of convective storms forming in a particular location. In some embodiments, the control module may classify weather returns or determine an operation parameter or point of interest based on the Equilibrium Level (EL), which may represent a limit of storm top height. For example, an operation parameter that limits the onboard weather radar system 202 from scanning above an altitude of 40,000 feet may be determined based on an EL value of 40,000 feet, which limits the scan area to the storm top height. However, it will be appreciated that the onboard weather radar system 202 may direct scans to altitudes beyond the EL height or below the EL height, in some cases based on system settings or operator input.

In some embodiments, the control module may classify weather returns or determine an operation parameter or point of interest based on the K Index (KI), which may be indicative of convective and heavy-rain-producing environments. In some embodiments, KI may be computed from, but not limited to, temperatures at 850, 700, and 500 hPa, and dew points at 850 and 700 hPa. Typically, higher moisture levels and greater temperature differences at 850-500 hPa correlate to a higher KI value and potential for convection. For example, thunderstorm probability east of the Rocky Mountains may range from a very low likelihood when KI<20 (KI<15 west of the Rocky Mountains) to a likelihood of widespread activity when KI>35 (KI>30 west of the Rocky Mountains). Accordingly, the K Index may indicate whether convection is likely or not likely to occur. In some embodiments, an operation parameter or point of interest used to control operation of the onboard weather radar system 202 may be determined based on the K index.

In some embodiments, the control module may classify weather returns or determine an operation parameter or point of interest based on the Lifted Index (LI), which may indicate potential convective activity, and which may be calculated as the difference between the observed temperature at 500 hPa and the temperature of the surface of an air parcel lifted to 500 hPa. Typically, a negative LI is associated with an unstable environment. For example, in one embodiment, LI values for indicating severe weather potential in the United States east of the Rocky Mountains may correlate as follows: a $-2$ LI value correlates to a weak severe weather potential, a $-3$ to $-5$ LI value correlates to a moderate severe weather potential, and a $-6$ or less LI value correlates to a strong severe weather potential. In one embodiment, LI values for indicating severe weather potential in the United States west of the Rocky Mountains are modified upward (i.e. less negative) to account for increased altitude as compared with the eastern two-thirds of the United States.

In some embodiments, the control module may classify weather returns or determine an operation parameter or point of interest based on the Showalter Stability Index (SSI), indicate the likelihood of convective activity and the likely severity of such convective activity. For examples, in one embodiment, SSI values indicating weather severity in the United States east of the Rocky Mountains may be empirically linked to convective events as follows: $+3$ to $+1$ SSI value correlates to rain showers and some thundershowers, a $+1$ to $-2$ SSI value correlates to thundershowers, a $-3$ to $-6$ SSI value correlates to severe thunderstorms, a less than $-6$ SSI value correlates to severe thunderstorms and possible tornadoes. For example, based on detecting a first weather cell having a $+2$ SSI value and a second weather cell having a $-6$ SSI value, the onboard weather radar system 202 may direct scans to the second weather cell because the second weather cell may affect the aircraft's flight route or may pose greater risks than the first weather cell due to having higher levels of convective activity.

In some embodiments, the control module may classify weather returns or determine an operation parameter or point of interest based on the Severe Weather Threat SWEAT (SWEAT) index, which may be used to assess severe weather potential. Inputs used by the SWEAT index may include the Total Totals index (TT), 850 hPa dew point, 850 hPa wind speed and direction, and 500 hPa wind speed and direction. In some embodiments, a greater probability of severe weather is indicated by a higher SWEAT index value, which is caused by higher temperature and moisture at low levels, cooler temperatures aloft, large vertical wind shear, and wind direction veering with height. In some embodiments, SWEAT index values may be empirically linked to convective events as follows: a 150-300 SWEAT value indicates a slight severe weather potential, a 300-400 SWEAT value indicates severe possibility of severe weather potential, and a 400 or greater SWEAT value indicates tornadic possibility. The Total Totals Index (TT) may be computed using the temperature and dew point at 850 hPa and the temperature at 500 hPa. In some embodiments, greater environmental instability, and therefore higher TT values, are indicated by a higher 850 hPa dew point and a lower 500 hPa temperature. In some embodiments, TT values may be empirically linked to severe weather likelihood as follows: 44 TT indicates a possibility of thunderstorms, 50 TT indicates that severe thunderstorms are possible, and 55 TT or greater indicates that severe thunderstorms are likely and that tornadoes are possible. In one embodiment, for example, based on detecting a first weather cell having a 44 TT value and a second weather cell having a 50 TT value, the onboard weather radar system 202 may direct scans to the second weather cell because the second weather cell may affect the aircraft's flight route or may pose greater risks than the first weather cell due to having a higher likelihood of severe weather.

In some embodiments, weather radar system 202 may receive weather data relating to, and classify weather returns or determine an operation parameter or point of interest based on, winds aloft (i.e., the direction and speed of winds as a function of altitude and geographic location). In some embodiments, the operation parameter or point of interest may be based at least in part on winds aloft to modify or to further shape identified weather threats provided on display 20. For example, the operational parameter may cause the onboard weather radar system to extend scans in the direction that air is flowing based on strong winds at the altitude level of detected weather, which are likely to cause the detected weather to extend further in the direction the air is flowing. In another example, based on detecting water-coated hail, which has a high reflectivity, the operational parameter may indicate that the hail may extend downwind some distance from the detected cell. In another example, based on detecting dry hail, which has poor radar reflectivity, the operational parameter may indicate that the hail is likely to be cast downwind, thereby creating a hazard substantially invisible to some radar.

In some embodiments, weather radar system 202 may receive weather data relating to, and classify weather returns or determine an operation parameter or point of interest based on, satellite data, such as for example, weather data receive from the GOES or POES systems. In some embodiments, satellites may use a sounder that uses either infrared or passive millimeter wave reception to sample the atmospheric temperature at various altitudes similar to weather balloon sounding techniques, and thereby provide a range of indices of storm likelihood (e.g., similar to those described above), which can be used to classify weather data or configure and/or control the onboard weather radar system 202. For example, the onboard weather radar system 202 may use the satellite-derived data to supplement conventional soundings, filling in the times or the locations where conventional sounding data is not available. In some embodiments, for example, the Cloud Mask may identify all regions within view of the satellite that have some form of cloud cover, which can then be used to identify returns due to flocks of birds, insects, etc. In some cases, Cloud Mask data may be utilized by the weather radar system 202 only when such events occur in areas with little or substantially no cloud cover. In some embodiments, the Cloud Mask may be dilated by some distance (e.g., 20 miles, etc.) to provide for changes in the extent of cloud coverage since the original satellite data was acquired. In another example, satellite imagery may distinguish volcanic ash from other radar returns since, for example, ash has a distinctive infrared signature compared to clouds of water vapor. Data received from satellite systems may also indicate an estimated cloud top pressure, which may indicate a cloud top altitude height. A point of interest or operational parameter for controlling the onboard weather radar system 202 may be based on the cloud top altitude height. Satellite data may also indicate where convective storms may potentially form based on, for example, raising warm moist air above the equilibrium level in a thunderhead. In one example, data that indicates regions where strong convection is likely to occur may be derived from a product that provides convection initiation data and/or overshooting tops and thermal couplets data. For example, based on the convection initiation data and/or overshooting tops and thermal couplets data, the onboard weather radar system 202 may be controlled to focus scans in a direction and/or at a sufficient range to acquire data where severe weather is likely to occur.

It will be appreciated that any combination of data from any number of external sources may be combined, merged, and/or analyzed to provide weather data on a display screen or to determine an operation parameter or point of interest used to control onboard weather radar system 202. It will also be appreciated that other data sources may be used than those specifically mentioned in this disclosure, and that any data, index, or parameter that classifies, describes, or otherwise characterizes weather conditions may be adapted and/or interpreted by the control module to control the onboard weather radar system 202, including controlling scanning characteristics and weather detection characteristics to increase and/or maximize the probability of detecting convective activity, other weather condition, or a non-weather event.

Figure 4A:
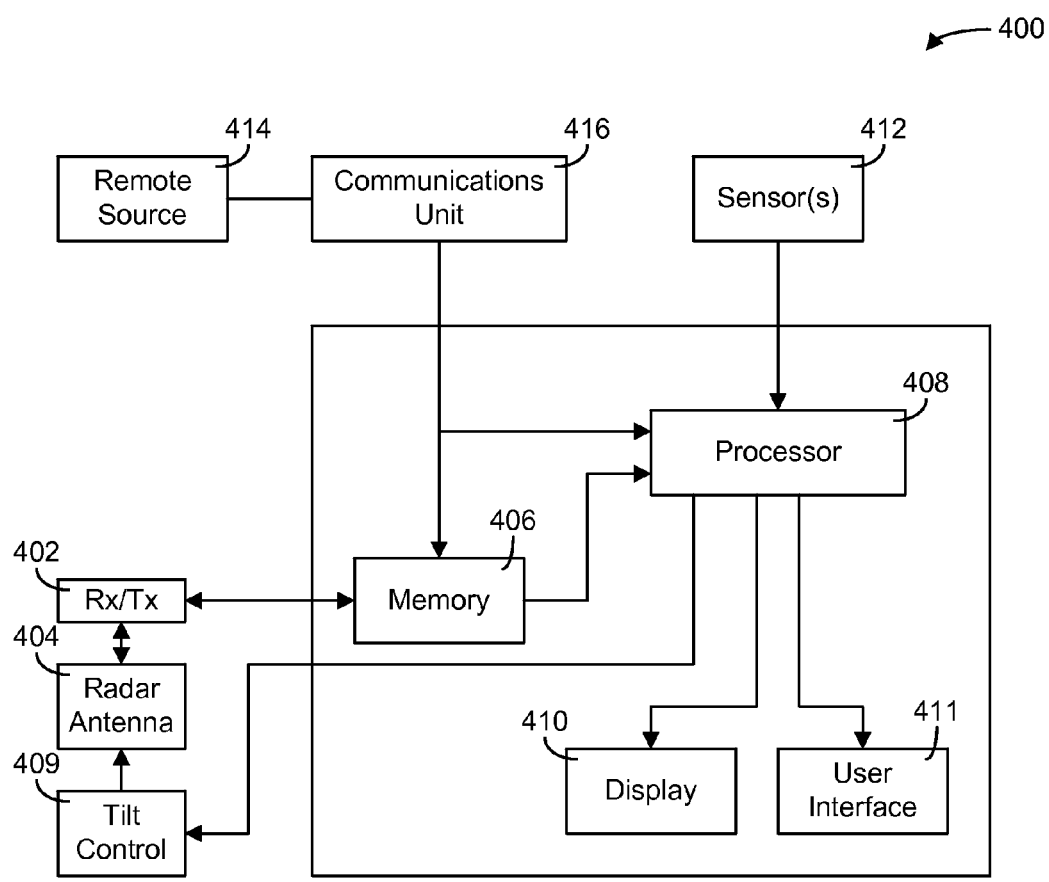
FIG. 4A is a block diagram of an exemplary weather radar system.

Referring to FIG. 4A, an exemplary weather radar system 400 is shown. System 400 may include a weather radar receiver/transmitter 402 (e.g., similar to or exactly the same as the communications module or communications system 208), weather radar adjustable antenna 404, a memory 406 (e.g., a multi-scan, multi-tilt angle memory), a processor 408 (e.g., similar to or exactly the same as the control module or processor 204) and a system bus that couples various system components including memory 406 to processor 408. System 400 may be any system similar to or exactly the same as, or may be a component part of, weather detection system 200 and/or aircraft communications system 300. System 400 may also include a tilt control 409 for automatically controlling the tilt angle (mechanical or electronic) of antenna 404. In some embodiments, this auto control may include an additional manual control feature as well. System 400 may also be in communication with one or more displays 410 (e.g., a display similar to display 20 shown in FIG. 1), one or more UI elements 411 (e.g., similar to UI elements 22 shown in FIG. 1) and one or more sensors 412, and also in communication with one or more remote data sources 414 (e.g., another aircraft or a ground station) via a communications unit 416 (e.g., radio or other wireless communication device).

Figure 4B:
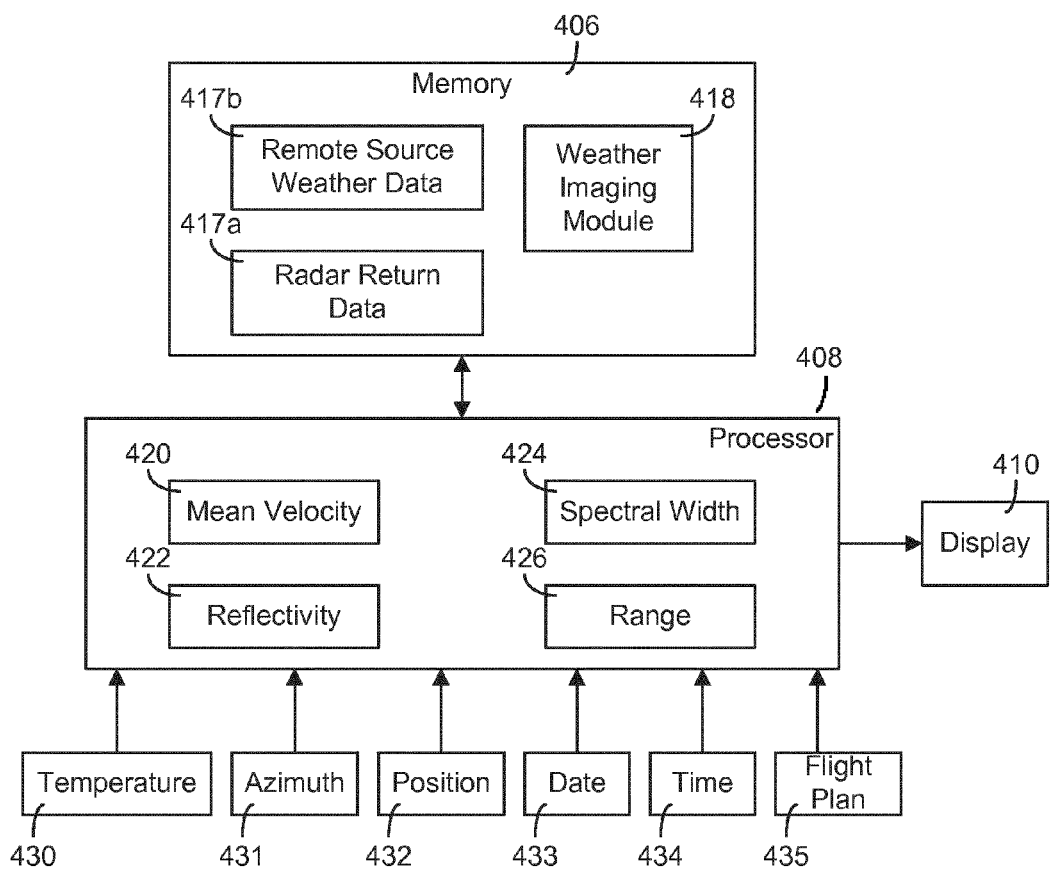
FIG. 4B is a data flow diagram of an exemplary weather radar system.

Memory 406 may include any type of machine-readable storage device capable of storing radar returns or associated weather data 417 (shown in FIG. 4B) or program instructions for analysis/processing by processor 408, such as weather image application 418 (shown in FIG. 4B). Memory 406 may be, for example, a non-transitory machine-readable media for carrying or having machine-executable instructions or data structures stored thereon. Such machine-readable media may be any available media that may be accessed by a general purpose or special purpose computer or other machine with a processor. By way of example, such machine-readable media may comprise random access memory (RAM), read only memory (ROM), erasable programmable read only memory (EPROM), electrically erasable programmable memory (EEPROM), CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine. System 400 may have one or more memories 406 that use the same or a different memory technology. Memory 406 may store weather data 417 and weather image application 418 in addition to other instructions or data.

In some embodiments, memory 406 may be capable of storing in a readily addressable and rapidly retrievable manner at least two sets of weather data 417 resulting from two or more antenna sweeps at different angles, although a single scan of data may also be used in some embodiments. Memory 406 may also include a three-dimensional storage buffer for storing weather radar parameters according to X, Y and Z coordinates according to one embodiment. Memory 406 may further include weather data received from external sources. The storage of radar data and the form of the weather data 417 stored therein is not disclosed in a limiting fashion. A variety of techniques for storing weather data 417 may be used as well.

In some embodiments, weather data 417 may be stored (e.g., in the memory 406) as a mathematical equation representation of the information. The mathematical equation representation may be a piecewise linear function, piecewise nonlinear function, coefficients of a cubic spline, coefficients of a polynomial function, etc., that represent vertical representations of a weather condition based on the horizontal scan data and/or horizontal representation of the weather condition based on the vertical scan data. The function may be an equation based on weather parameters that may be sensor driven, model driven, a merger of sensor and model, etc. Although horizontal scan data is described, alternative embodiments may include Cartesian coordinates, rho/theta input, latitude and longitude coordinates, altitude, etc. Weather conditions may be estimated for any desired point in space with the vertical dimension being the subject of the Radar Equation (e.g., how much power is returned to the radar receiver given what it is pointed at).

Processor 408 may be implemented in hardware, firmware, software, or any combination of these methods. System 400 may have one or more processors 408 that use the same or a different processing technology. Additionally, processor 408 may be a separate component of system 400 or may be embedded within another component of system 400. Processor 408 may execute instructions that may be written using one or more programming languages, scripting languages, assembly languages, etc. The instructions may be carried out by, for example, a special purpose computer, logic circuits, or hardware circuits. The term "execute" is the process of running an application or the carrying out of the operation called for by an instruction. Processor 408 may process data and/or execute applications stored in memory 406, such as weather data 417 and weather image application 418 and/or other instructions.

Processor 408 may be included as part of a multi-scan, multi-tilt angle weather radar system and may perform the customary functions performed by a conventional weather radar return processing unit. Processor 408 may also perform several additional operations based upon the additional data and/or instructions provided in memory 406. In general, processor 408 may merge or cross qualify portions, or ranges, of the radar returns of several different antenna sweeps at several different tilt angles, and/or weather data received from one or more external sources so that a single, relatively clutter-free image may be presented to the pilot based upon the several separate scans. The radar returns may be processed by processor 408 to generate a 2-D, 3-D, or 4-D weather profile of the weather near the aircraft. In some embodiments, processor 408 may merge or cross qualify portions, or ranges, of the radar returns or weather data of several different sources, including weather data from one or more remote sources 414 (e.g., external sources such as terrestrial station 220, 320, satellite 310, other aircraft 230, 240, etc.), so that a composite or fused image may be presented to the pilot based upon the several weather data sources.

Processor 408 may process weather radar returns to identify or sense the presence of weather conditions in front of (e.g., in the flight path) or in view of the aircraft. In some embodiments, processor 408 may utilize the altitude and range of the weather condition to generate a vertical profile associated with the weather. Processor 408 may scan across an array of azimuths to generate a 3-D weather profile of the weather near the aircraft, which may be stored for later presentation and/or displayed on display 410. In some embodiments, additional visual indicators other than the representation of weather are provided on display 410. In some embodiments, a range and bearing matrix having range markers indicating distance from a current location of the aircraft and bearing markers indicating azimuths from a current flight path or bearing of the aircraft may be provided and may assist the pilot in cognitive recognition of weather features from the pilot's perspective.

Referring now to FIG. 4B, a data flow diagram of exemplary weather radar system 400 is shown. As shown in FIG. 4B, processor 408 may provide a velocity parameter 420, such as a mean velocity parameter and a spectral width parameter 422 (e.g., derived from weather radar returns or from weather data from a remote source for individual or grouped weather cells). Alternatively, other types of velocity parameters can be utilized. In addition, processor 408 may provide a reflectivity parameter 424 and a range parameter 426. Range parameter 426 along with scan angle position may be used to plot the location of a weather condition on display 410. Processor 408 may also receive a temperature parameter 430, an azimuth 431, a location 432, a date 433, a time 434, and a flight plan 435 from another source, such as an external sensor or system, among other data (e.g., air pressure, dew point, winds at altitude, etc.). In some embodiments, parameters 430, 431, 432, 433, 434 and 435 may be computed by processor 408 using data stored in memory 406, such as radar return data 417a or remote source data 417b.

Weather data 417a from returns received by antenna 404 and weather data 417b from remote source 414 may be stored in memory 406. Weather data 417b from remote source 414 may be received via communications unit 416 (shown in FIG. 4A). Weather data 417 may, for example, be based on received horizontal and/or vertical radar scans and/or data from other sources 414 (e.g., NEXRAD weather data). Weather data 417 may also be from another weather radar source or data from an onboard weather radar system operating at a different frequency, such as a millimeter frequency, a Ka band frequency, a W band frequency, etc. In some embodiments, weather data 417 may be from a non-radar airborne source (a LIDAR source, an infrared source, etc.). Weather data 417 may include weather data as described with reference to FIG. 3 above. For example, weather data 417 may include a time of sensing data, such as a time stamp, and motion vector data (e.g., individual weather cell and average motion vector data) for temporal and spatial correlation (e.g., NEXRAD data received from remote source 414).

Referring again to FIG. 4A, memory 406 may store a weather imaging module 418 that may be executed by processor 408. Weather imaging module 418 may be, for example, one or more program modules including routines, programs, objects, components, data structures, etc. that perform particular tasks or implement particular data types. Weather imaging module 418 may be written using, for example, one or more programming languages, assembly languages, scripting languages, etc. According to an exemplary embodiment, weather imaging module 418 may be an organized set of instructions that, when executed, cause processor 408 to utilize weather data 417a from returns received by antenna 404 and/or weather data 417b received from remote source 414 stored in memory 406 to provide individual, composite, fused, or overlay image data indicative of a weather condition for display on display 410. The image data derived from weather data 417*a* and 417*b* may be spatially correlated by weather imaging module 418 using, for example, time of sensing information and motion vector values. In some embodiments, growth and decay information may be received, which may be used by weather imaging module 418 to increase or decrease the size, shape, and intensity of an image or other visual indication of a weather condition displayed in accordance with time. In some embodiments, weather imaging module 418 may determine a confidence factor reflecting the degree to which weather data 417 received from two or more sources agree in their characterization of the weather condition. In some embodiments, weather imaging module 418 may combine estimates of storm top height received from two or more sources of weather data 417 to provide image data indicative of the vertical extent of a weather condition.

Figure 5:
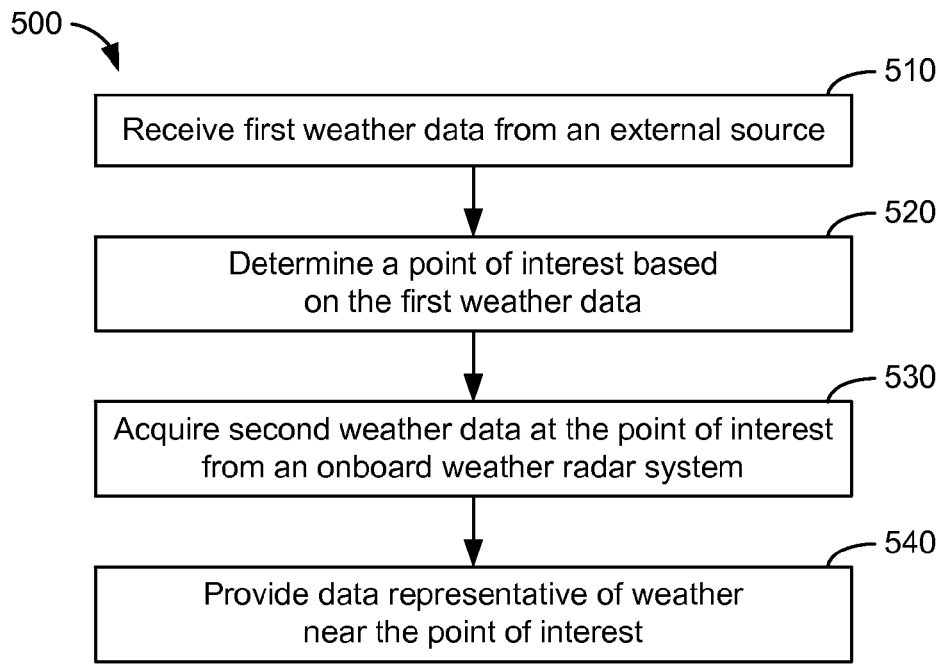
FIG. 5 is a flow diagram of an exemplary process for controlling a weather radar system.

Referring to FIG. 5, a flow diagram of an exemplary process 500 for controlling a weather radar system is shown according to an exemplary embodiment. According to one embodiment, process 500 is a computer-implemented method utilizing any one of, or combination of, weather detection system 200, aircraft communications system 300, and/or weather radar system 400. Process 500 may be implemented using any combination of computer hardware and software. According to one embodiment, first weather data is received from an external source (510). For example, weather data may be received from any one of, or a combination of, terrestrial station 220, 230, other aircraft 230, 240, satellite 310, etc., such as timestamp and location data associated with a plurality of convective cells ranging in severity. Next, a point of interest is determined based on the first weather data (520). For example, the control module may determine a point of interest based on the most out-of-date weather data and/or based on the convective cell that is most severe. Then, second weather data is acquired at the point of interest from an onboard weather radar system (530). For example, the control module may control an onboard weather radar system 202 to acquire second weather data at the determined point of interest to, for example, acquire more up-to-date data and/or to monitor the most threatening convective cells. Then, an image representative of weather near the point of interest is provided (540). For example, data based on at least one of or both the first weather data and second weather data may be displayed on a display screen in an aircraft cockpit, such as flight display 20.

Figure 6:
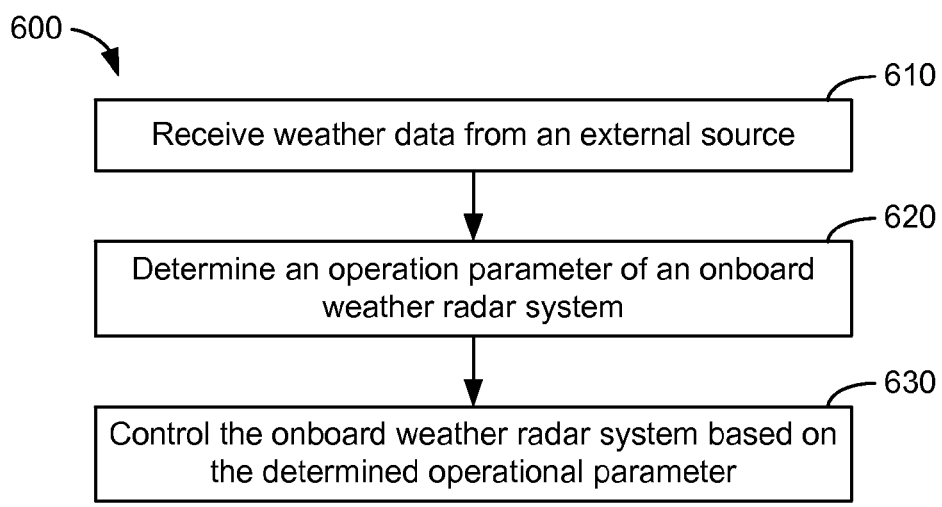
FIG. 6 is a flow diagram of an exemplary process for controlling an onboard weather radar system according to another embodiment.

Referring to FIG. 6, a flow diagram of an exemplary process 600 for controlling an onboard weather radar system is shown according to another embodiment. According to one embodiment, process 600 is a computer-implemented method utilizing any one of, or combination of, weather detection system 200, aircraft communications system 300, and/or weather radar system 400. Process 600 may be implemented using any combination of computer hardware and software. According to one embodiment, weather data is received from an external source (610). For example, weather data may be received from any one of, or a combination of, terrestrial station 220, 230, other aircraft 230, 240, satellite 310, etc., such as echo top data indicating the highest altitude of detected clouds. Next, an operation parameter of an onboard weather radar system is determined (620). For example, the control module may determine an operational parameter based on the echo top data, such as a maximum scanning altitude. Then, the onboard weather radar system is controlled based on the determined operational parameter (630). For example, the control module may control the onboard weather radar system 202 to collect vertical samples no higher than the maximum scanning altitude.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. §112, sixth paragraph, unless the element is expressly recited using the phrase "means for." Further, no element, component or method step in the present disclosure is intended to be dedicated to the public, regardless of whether the element, component or method step is explicitly recited in the claims.

As noted above, embodiments within the scope of the present disclosure include program products comprising machine-readable storage media for carrying or having machine-executable instructions or data structures stored thereon. Such machine-readable storage media can be any available media that can be accessed by a general purpose or special purpose computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions include, for example, instructions and data which cause a general purpose computer, special purpose computer, or special purpose processing machine to perform a certain function or group of functions. Machine or computer-readable storage media, as referenced herein, do not include transitory media (i.e., signals in space).

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a computing device in the form of a computer, including a processing unit, a system memory, and a system bus that couples various system components including the system memory to the processing unit. The system memory may include read only memory (ROM) and random access memory (RAM) or other non-transitory storage medium. The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts and diagrams provided herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A weather radar system, comprising:
a communications system including a transmitter-receiver configured to receive first weather data indicative of a characteristic of a first weather condition from an external location; and
a processor comprising a control module coupled with the communications system and configured to:
determine an operational parameter of an onboard weather radar system based on the characteristic of the first weather condition;
control operation of the onboard weather radar system based on the determined operational parameter by controlling a radar scanning operation of the onboard weather radar system to acquire second weather data, wherein the determined operational parameter comprises a plurality of areas where storms are not likely to arise based on a threshold convective likelihood value, and wherein the control module is further configured to control operation of the onboard weather radar system to decrease a number of scans directed to the plurality of areas where storms are not likely to arise; and
transmit, by the transmitter-receiver, the second weather data to an external weather radar system.

2. The weather radar system of claim 1, wherein the characteristic of the first weather condition comprises a maximum altitude of a detected cloud formation, and wherein the determined operational parameter comprises a maximum scanning altitude.

3. The weather radar system of claim 1, wherein the characteristic of the first weather condition comprises a nature of forecasted weather cells, the processor further configured to vary pulse widths of the radar scanning operation based on the nature of forecasted weather cells.

4. The weather radar system of claim 1, wherein the determined operational parameter comprises at least one of a maximum number of scanning pulses, a maximum width of scanning pulses, and a maximum repetition frequency of scanning pulses.

5. The weather radar system of claim 1, wherein the control module is further configured to analyze the second weather data based on the characteristic of the first weather condition indicating a level of convective activity, and provide display data based on the second weather data.

6. The weather radar system of claim 1, wherein the control module is further configured to modify a scan pattern of the onboard weather radar system based on the first weather data and a range of the weather radar system.

7. The weather radar system of claim 1, wherein the determined operational parameter defines an area of a weather cell, and the processor is configured to vary a pulse width of the radar scanning operation.

8. The weather radar system of claim 1, wherein the first weather data includes Vertically Integrated Liquid Water data (VIL) or Composite Reflectivity data (CR), and the processor is configured to use the VIL data or CR data to control the radar scanning operation of the onboard weather radar system to identify missed storm cells.

9. A method, comprising:
receiving, by a communications module, first weather data indicative of a characteristic of a first weather condition from an external location;
determining, by a control module, an operation parameter of an onboard weather radar system based on the characteristic of the first weather condition; and
controlling, by the control module, the onboard weather radar system based on the operation parameter by controlling a radar scanning operation of the onboard weather radar system to acquire second weather data by allocating weather radar scans to areas where the first weather data is least current.

10. The method of claim 9, wherein the characteristic of the first weather condition comprises a maximum altitude of a detected cloud formation, and wherein the operation parameter comprises a maximum scanning altitude.

11. The method of claim 9, wherein the characteristic of the first weather condition comprises a nature of forecasted weather cells, wherein controlling the radar scanning operation includes varying pulse widths of the radar scanning operation based on the nature of forecasted weather cells.

12. The method of claim 9, wherein the operation parameter comprises at least one of a maximum number of scanning pulses, a maximum width of scanning pulses, and a maximum repetition frequency of scanning pulses.

13. The method of claim 9, wherein the operation parameter comprises a plurality of areas where storms are not likely to arise based on a threshold convective likelihood value, and wherein the control module is further configured to control operation of the onboard weather radar system to decrease a number of scans directed to the plurality of areas where storms are not likely to arise.

\* \* \* \* \*